United States Patent [19]

Nakashima et al.

[11] Patent Number: 5,477,791
[45] Date of Patent: Dec. 26, 1995

[54] SEEDLING PLANTING APPARATUS

[75] Inventors: Hideo Nakashima, Kyoto; Tadashi Kondo, Minoo; Masahiro Kanesaki, Nagaokakyo, all of Japan

[73] Assignee: Yanmar Agricultural Equipment Co., Ltd., Osaka, Japan

[21] Appl. No.: 203,622

[22] Filed: Mar. 1, 1994

[30] Foreign Application Priority Data

| Mar. 4, 1993 | [JP] | Japan | 5-008837 |
| Mar. 4, 1993 | [JP] | Japan | 5-044157 |

[51] Int. Cl.$^6$ .................................................. A01C 11/02
[52] U.S. Cl. ............................ 111/105; 111/104; 221/214
[58] Field of Search ....................... 47/1 A, 901; 111/104, 111/105; 221/214, 215; 172/607

[56] References Cited

U.S. PATENT DOCUMENTS

| 2,949,083 | 8/1960 | Knowles . | |
| 4,893,571 | 1/1990 | Häkli et al. | 111/105 |
| 4,932,338 | 6/1990 | Watanabe et al. | 111/105 |
| 5,247,761 | 9/1993 | Miles et al. | 111/104 |
| 5,320,649 | 6/1994 | Holland | 111/105 |
| 5,353,723 | 10/1994 | Tesch, Jr. et al. | 111/105 |

FOREIGN PATENT DOCUMENTS

| 288873 | 11/1988 | European Pat. Off. | 48/1 A |
| 320995 | 12/1988 | European Pat. Off. . | |
| 62-138113 | 6/1987 | Japan . | |
| 2-90919 | 7/1990 | Japan . | |
| 3285601 | 12/1991 | Japan | 47/901 |
| 4088908 | 3/1992 | Japan | 111/104 |
| 4108308 | 4/1992 | Japan | 111/105 |
| 86/01975 | 4/1986 | WIPO | 47/1 A |

| 92/05684 | 4/1992 | WIPO . |

Primary Examiner—Henry E. Raduazo
Assistant Examiner—Spencer Warnick
Attorney, Agent, or Firm—Willian Brinks Hofer Gilson & Lione

[57] ABSTRACT

A seedling planting apparatus includes a carriage, a seedling supply device, a seedling picker device for picking seedlings from the seedling supply device at a predetermined picking position, and a seedling planting device for receiving the seedling from the seedling picker device at a predetermined delivery position and planting them in a field, the seedling supply device including a frame for supporting a seedling tray formed with multiple cells in which seedlings are grown, a traverse feeding mechanism for moving the frame transversely so that a selected cell is located at the predetermined picking position, and a longitudinal feeding mechanism for logitudinally feeding the seedling tray pitch by pitch when the frame is moved to a right or left terminal position thereof, the seedling picker device including a pair of seedling picker claws for picking the seedling from the cell and delivering it to the seedling planting device, and a seedling picker driving mechanism for moving the seedling picker claws from the predetermined picking position to the predetermined delivery position, the seedling picker driving mechanism being arranged such that the seedling picker claws are inserted into the cell at the predetermined picking position with a space between the leading ends thereof being slightly narrowed than the width of the upper end of the cell, and after the seedling picker claws are inserted, the seedling can be gripped by narrowing the space between the leading ends of the seedling picker claws, and the space between the leading ends of the seedling picker claws is widened at the predetermined delivery position. The thus constituted seedling planting apparatus can effect proper planting of seedlings with a mechanism of simple structure.

17 Claims, 27 Drawing Sheets

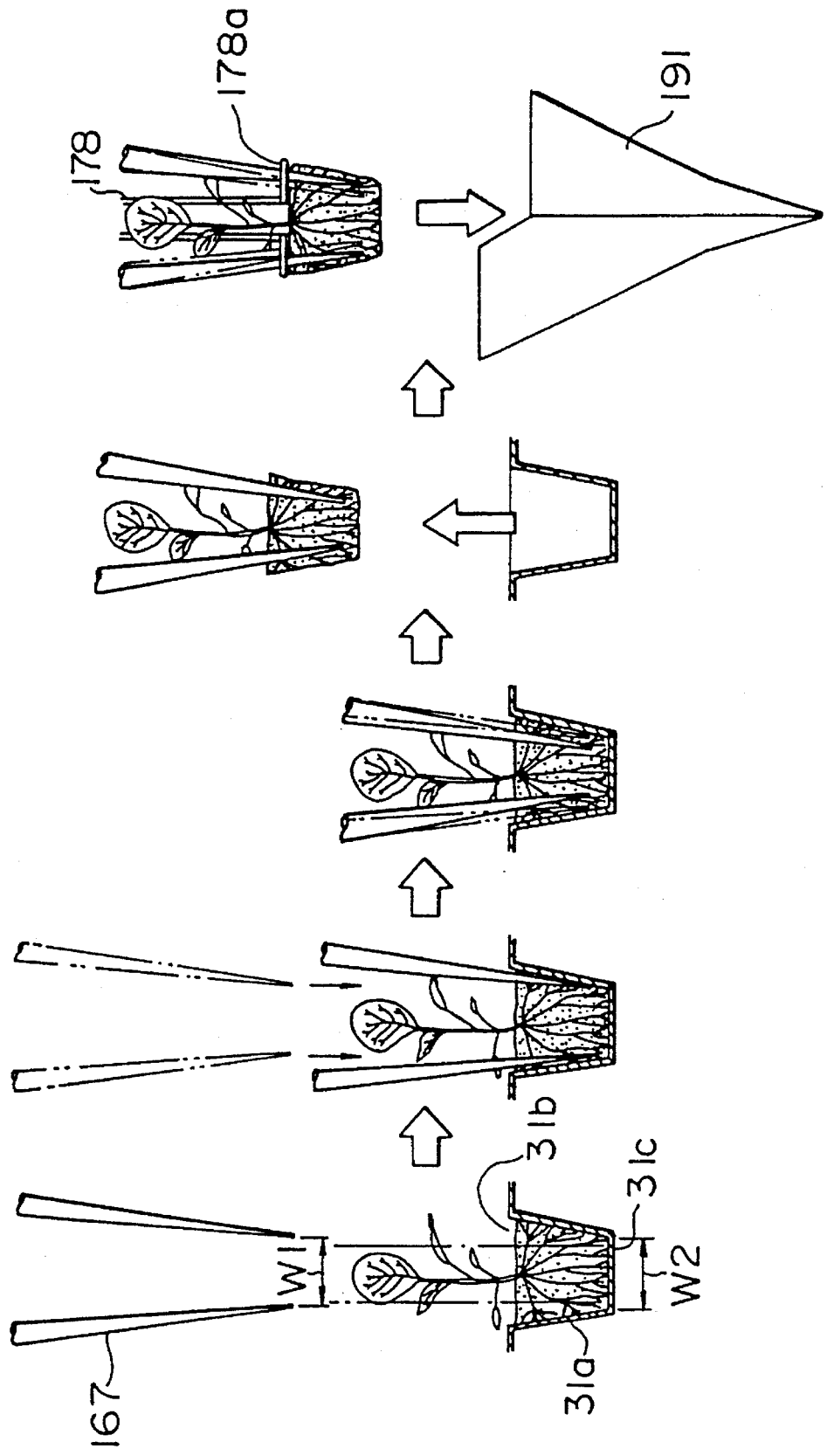

SEEDLING PLANTING APPARATUS

BACKGROUND OF THE INVENTION

The present invention relates to a seedling planting apparatus including a seedling supply device and a seedling picker device and, in particular, to a seedling planting apparatus which can effect proper planting of seedlings with a mechanism of simple structure.

DESCRIPTION OF THE PRIOR ART

Japanese Utility Model Laid-Open No. 2-90919 discloses a seedling planting apparatus including a carriage, a seedling supply device and a seedling planting device for planting seedlings supplied from the seedling supply device in a field. The seedling supply device of the prior apparatus has a longitudinal feeding mechanism for feeding a seedling tray formed with a plurarity of cells each adapted for receiving a seedling to the seedling planting device longitudinally, by which each seedling can be fed to the seedling planting device pitch by pitch. Further, the seedling planting device of the prior apparatus has seedling picker claws adapted to reciprocate transversely, by which the individual seedlings can be picked from the cells and then delivered to a seedling planting claw to plant them in the field.

However, because the prior apparatus is arranged such that the seedling picker claws reciprocate transversely to pick seedlings from the cells and to deliver them to the seedling planting claw, a complicated mechanism has to be used for actuating the seedling planting claw. Further, there is a problem that the planting of the seedlings cannot be effected properly, due to the difficulty of accurately positioning the seedling planting claw.

Further, there is known a prior seedling planting apparatus having a seedling tray formed with multiple cells each tapering off from the upper opening to the bottom thereof, wherein the seedling grown in each of the cells is picked by a pair of seedling picker claws and delivered to a seedling planting claw to plant it in the field. In this prior apparatus, because each cell is shaped to taper off from the upper opening to the bottom thereof, during the picking of the seedling from the cell, the seedling picker claws are inserted into the cell so that the width of the leading ends of the claws is almost equal to that of the bottom of the cell.

However, in the prior apparatus, because the seedling is more weakly roared in the center portion of the cell than in the portion adjacent to the cell wall, when the seedling is gripped by the picker claws during the planting operation, the seedling falls apart and, therefore, it is difficult to properly plant the seedling in the field.

SUMMARY OF THE INVENTION

It is therefore an object of the prevent invention to provide a seedling planting apparatus which can effect proper planting of seedlings and, a seedling supply device and a seedling picker device mounted on the seedling planting apparatus.

The above and other objects of the prevent invention can be accomplished by a seedling planting apparatus including a carriage, a seedling supply device, a seedling picker device for picking seedlings from the seedling supply device at a predetermined picking position, and a seedling planting device for receiving the seedling from the seedling picker device at a predetermined delivery position and planting them in a field, the seedling supply device including a frame for supporting a seedling tray formed with multiple cells in which seedlings are grown, a traverse feeding mechanism for moving the frame transversely so that a selected cell is located at the predetermined picking position, and a longitudinal feeding mechanism for logitudinally feeding the seedling tray pitch by pitch when the frame is moved to a right or left terminal position thereof, the seedling picker device including a pair of seedling picker claws for picking the seedling from the cell and delivering it to the seedling planting device, and a seedling picker driving mechanism for moving the seedling picker claws from the predetermined picking position to the predetermined delivery position, with the seedling picker claws assuming an inclined posture in the picking position and a substantially erect posture in the delivery position, after the seedling picker claws have been inserted into the cells, the space between leading ends of the seedling picker claws is narrowed by a cam operatively connected with the seedling picker driving mechanism to grip the seedlings.

Further, the above and other objects of the prevent invention can be accomplished by a seedling supply device for a seedling planting apparatus including a frame for supporting a seedling tray formed with multiple cells in which seedlings are grown, a traverse feeding mechanism for moving the frame transversely so that a selected cell is located at a predetermined picking position, and a longitudinal feeding mechanism for logitudinally feeding the seedling tray pitch by pitch when the frame is moved to a right or left terminal position thereof.

Furthermore, the above and other objects of the prevent invention can be accomplished by a seedling picker device mounted on a seedling planting apparatus including a seedling supply device and a seedling planting device and adapted for picking a seedling from the seedling supply device at a predetermined picking position and delivering it to the seedling planting device at a predetermined delivery position, wherein the seedling picker device includes a pair of seedling picker claws for picking the seedling from a cell provided in the seedling supply device and delivering it to the seedling planting device, and a seedling picker driving mechanism for moving the seedling picker claws from the predetermined picking position to the predetermined delivery position with the seedling picker claws assuming an inclined posture in the picking position and a substantially erect posture in the delivery position, after the seedling picker claws have been inserted into the cells, the space between leading ends of the seedling picker claws is narrowed by a cam operatively connected with the seedling picker driving mechanism to grip the seedlings.

In a preferred aspect of the present invention, the longitudinal feeding mechanism includes a longitudinal feeding drive shaft provided at both of its ends with a pair of longitudinal feeding actuators and rotating constantly during planting operation, a follower cam shaft rotating in response to an intermittent movement of the longitudinal feeding actuators involved in a rotation of the longitudinal feeding drive shaft, a longitudinal feeding shaft to which a rotation of the follower cam shaft is transmitted, driving sprockets mounted on the longitudinal feeding shaft, and chains hung around the driving sprockets, the cam follower shaft and the longitudinal feeding shaft being within a single housing.

In another preferred aspect of the present invention, the seedling picker device comprises a planetary gear mechanism.

In a further preferred aspect of the present invention, the seedling picker claws are mounted with pushing members for pushing out the seedling gripped by the claws at the predetermined delivery position.

In a further preferred aspect of the present invention, the pushing members comprises ring members inserted over the claws.

The above and other objects and features of the present invention will become apparent from the following description made with reference to the accompanying drawings.

BRIEF DESCRIPTION OF THE DRAWINGS

FIGS. 26(a)–26(e) are a schematic view showing the picking motion of the seedling picker claws.

DESCRIPTION OF THE PREFERRED EMBODIMENT

Figure 1:
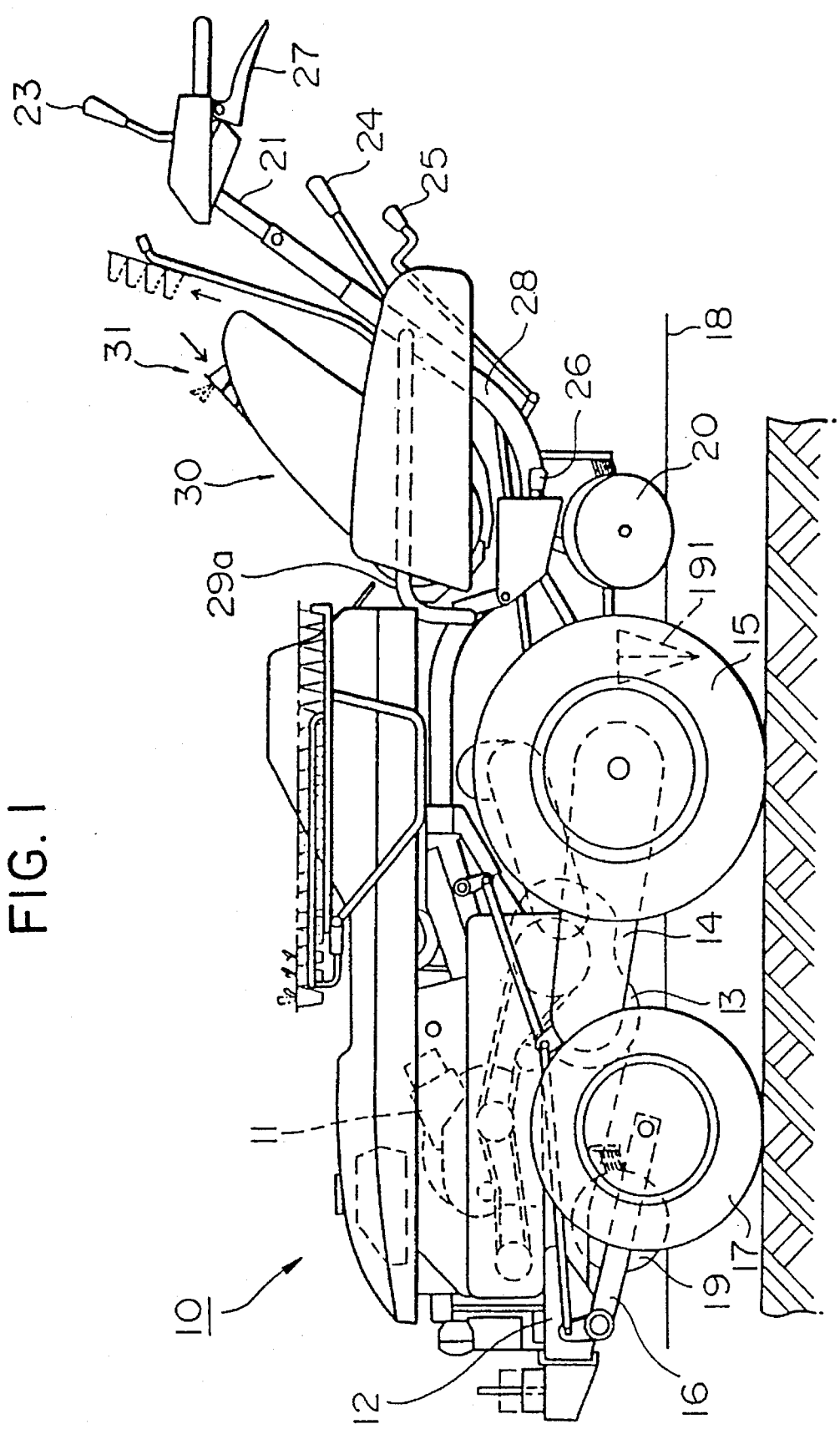
FIG. 1 is a schematic side view of a seedling planting apparatus which is an embodiment of the present invention.
Figure 2:
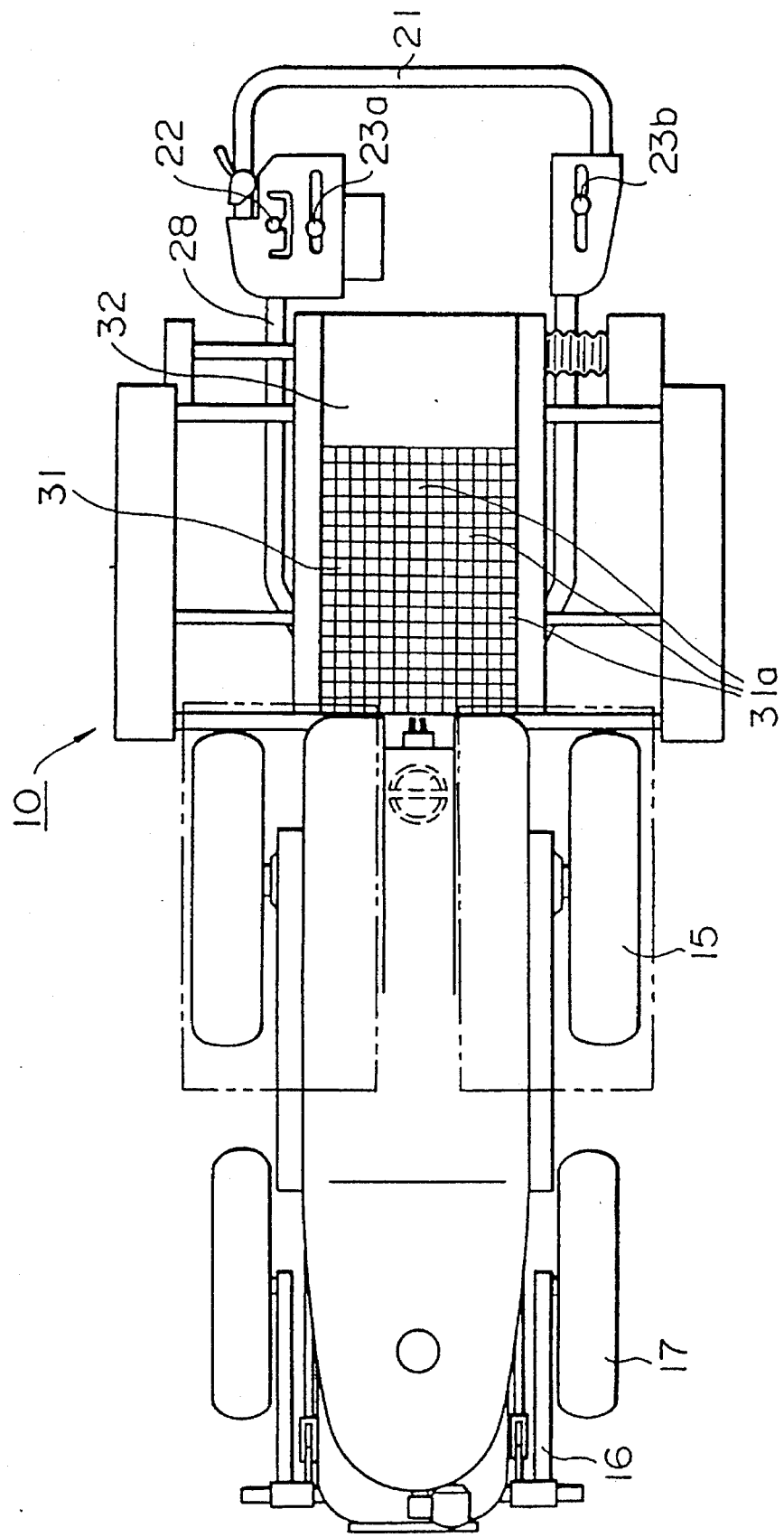
FIG. 2 is a schematic plan view of the seedling planting apparatus.
Figure 3:
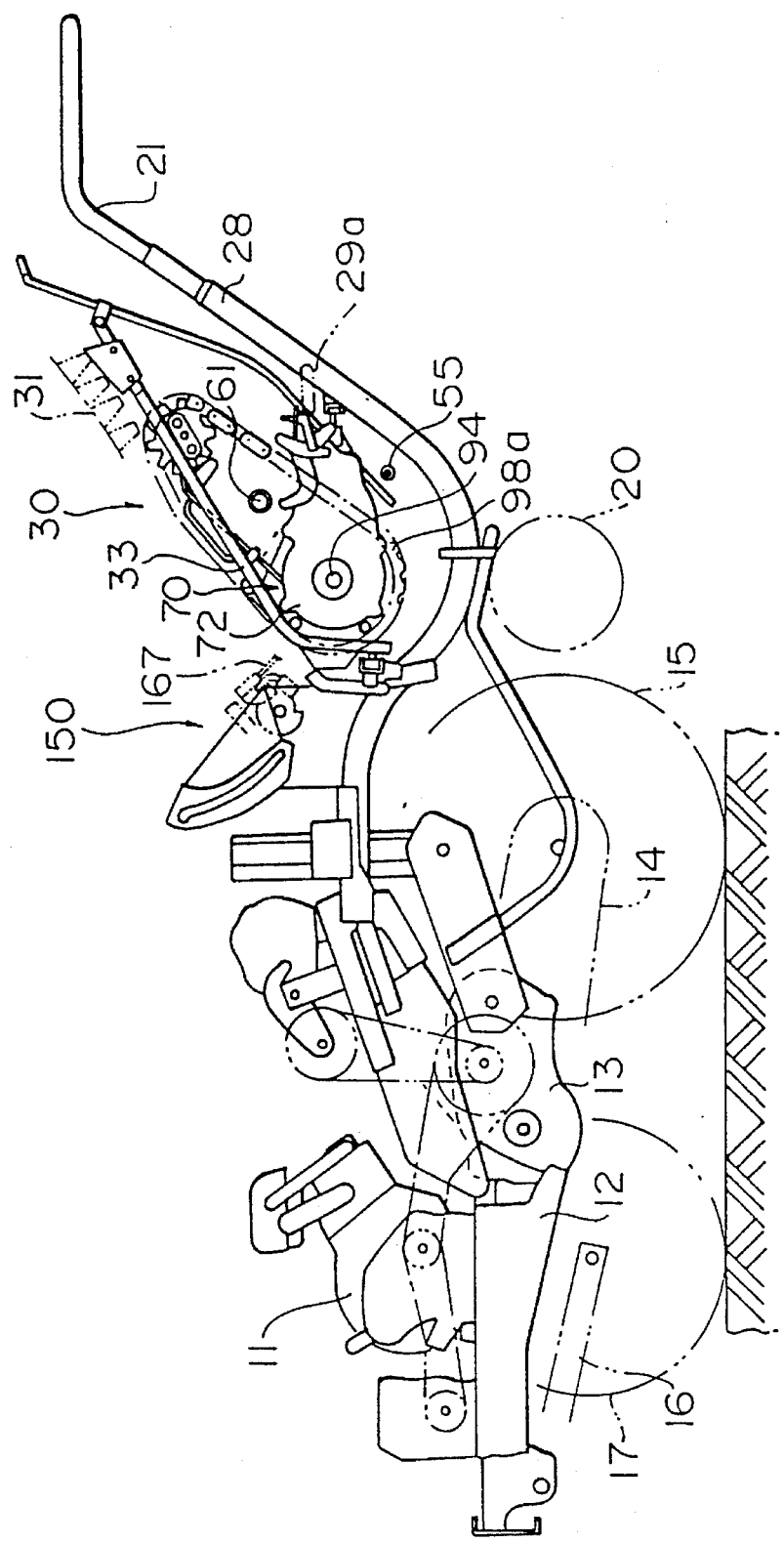
FIG. 3 is a schematic side view showing the general construction of the seedling planting apparatus.

As shown in FIGS. 1 to 4, a seedling planting apparatus generally indicated by a reference numeral 10 which is an embodiment of the present invention includes a front frame 12 for supporting an engine 11, a main transmission case 13 connected to the rear end of the front frame 12, a pair of rear driving wheels 15 connected to the main transmission case 13 through right and left transmission cases 14, a pair of front wheels 17 connected to the front end of the front frame 12 through an axle frame 16, a roller 19 for leveling a ridge 18, and a gauge wheel 20 for adjusting the planting depth of the seedlings. In FIGS. 1 and 2, the reference numerals 21, 22, 23a, 23b, 24, 25, 26 and 27 indicate a handle, a lever for raising and lowering the wheels, a clutch lever for engaging and disengaging a seedling planting driving portion, a main clutch lever, a speed change lever, a lever for adjusting the seedling planting interval, a lever for controlling the earth pressure applied on the gauge wheel 20, and a clutch for handling and turning the apparatus 10.

Figure 4:
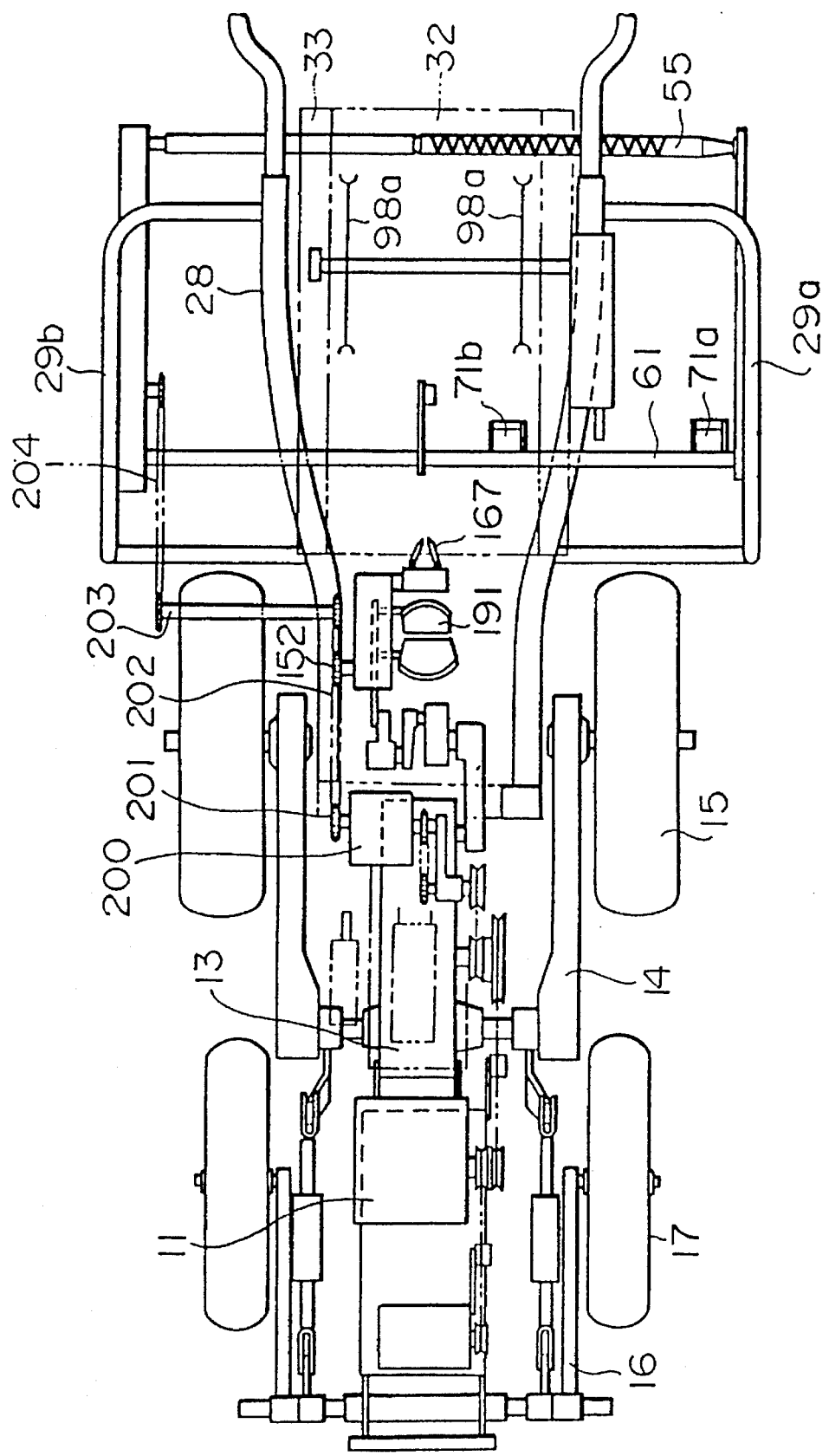
FIG. 4 is a schematic plan view showing the general construction of the seedling planting apparatus.

The apparatus 10 further includes a chassis frame 28 which is mounted behind the main transmission case 13 and to which, as shown in FIG. 4, side frames 29a and 29b are secured. A seedling supply device 30 for supplying the seedlings to a seedling picker device 150, described later, is disposed in the area surrounded by the chassis frame 28 and the side frames 29a and 29b. The seedling picker device 150 for picking the seedlings from the device 30 and delivering them to a seedling planting device 190, described later, is disposed in front of the device 30.

Figure 5:
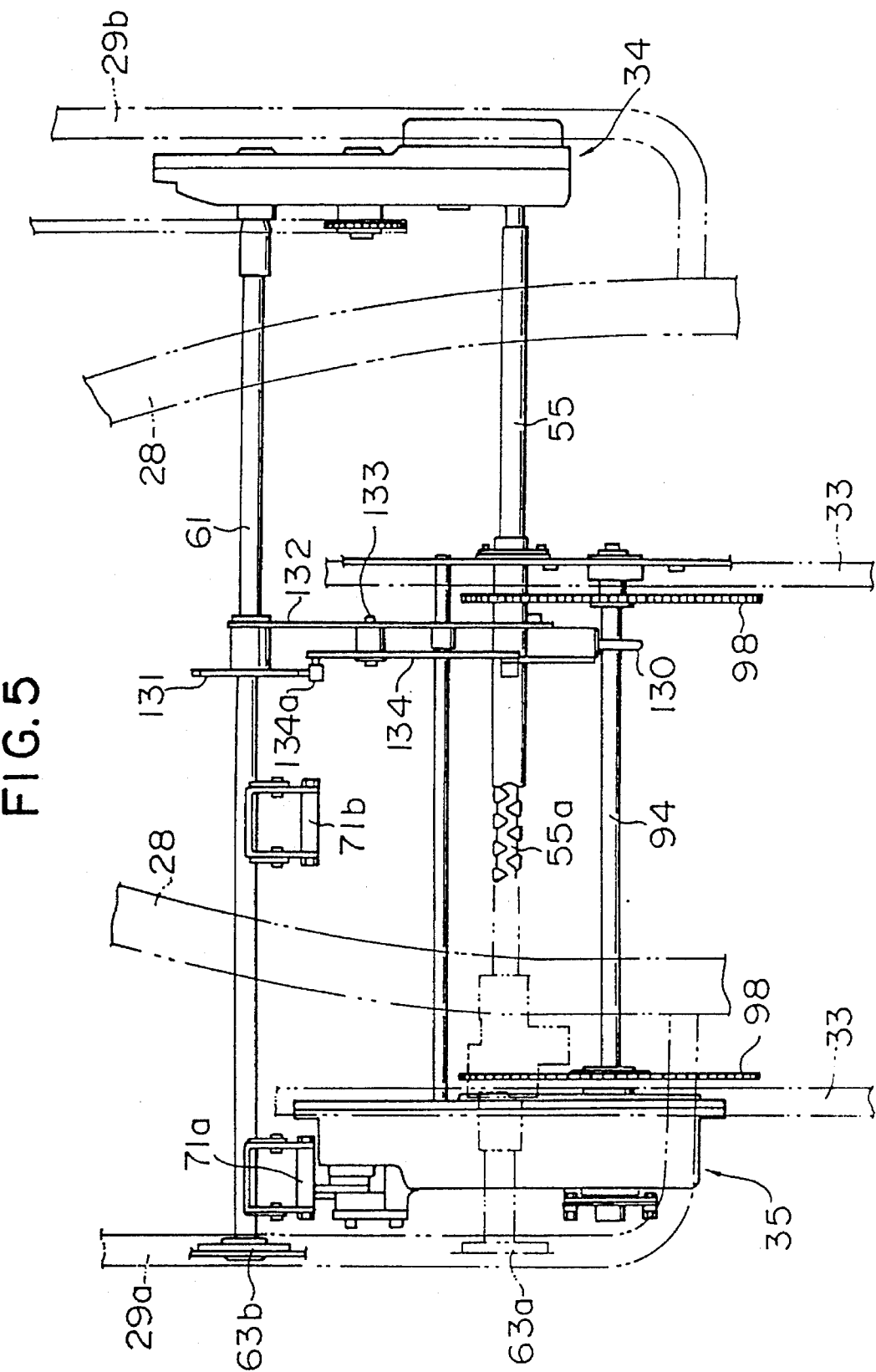
FIG. 5 is a schematic plan view showing the general construction of a seedling supply device of the seedling planting apparatus.

As shown in FIGS. 5 to 17, the device 30 includes a frame 33 provided with a table 32 for loading a seedling tray 31 thereon, a traverse feeding mechanism 34 for reciprocating the frame 33 transversely, and a longitudinal feeding mechanism 35 for moving the table 32 pitch by pitch longitudinally when the frame 33 reaches the right or left terminal position. In FIGS. 5 and 17, the seedling tray 31 is formed with multiple cells 31a divided at a constant dimension or dimensions longitudinally and transversely, each of which, as shown in FIG. 17, is shaped to gradually taper off from its upper opening portion 31b toward its bottom portion 31c.

Figure 6:
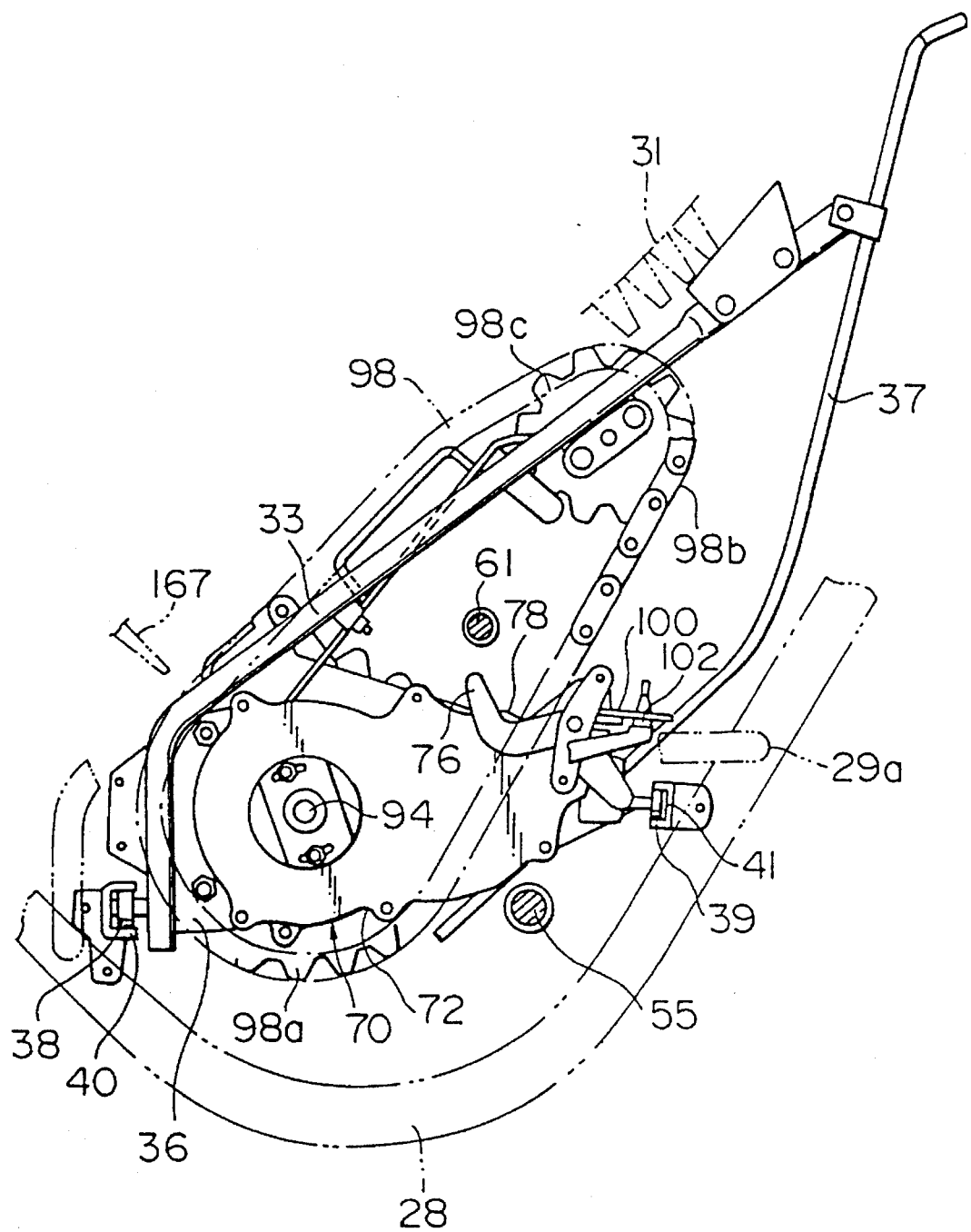
FIG. 6 is a schematic side view showing the general construction of the seedling supply device of the seedling planting apparatus.
Figure 7:
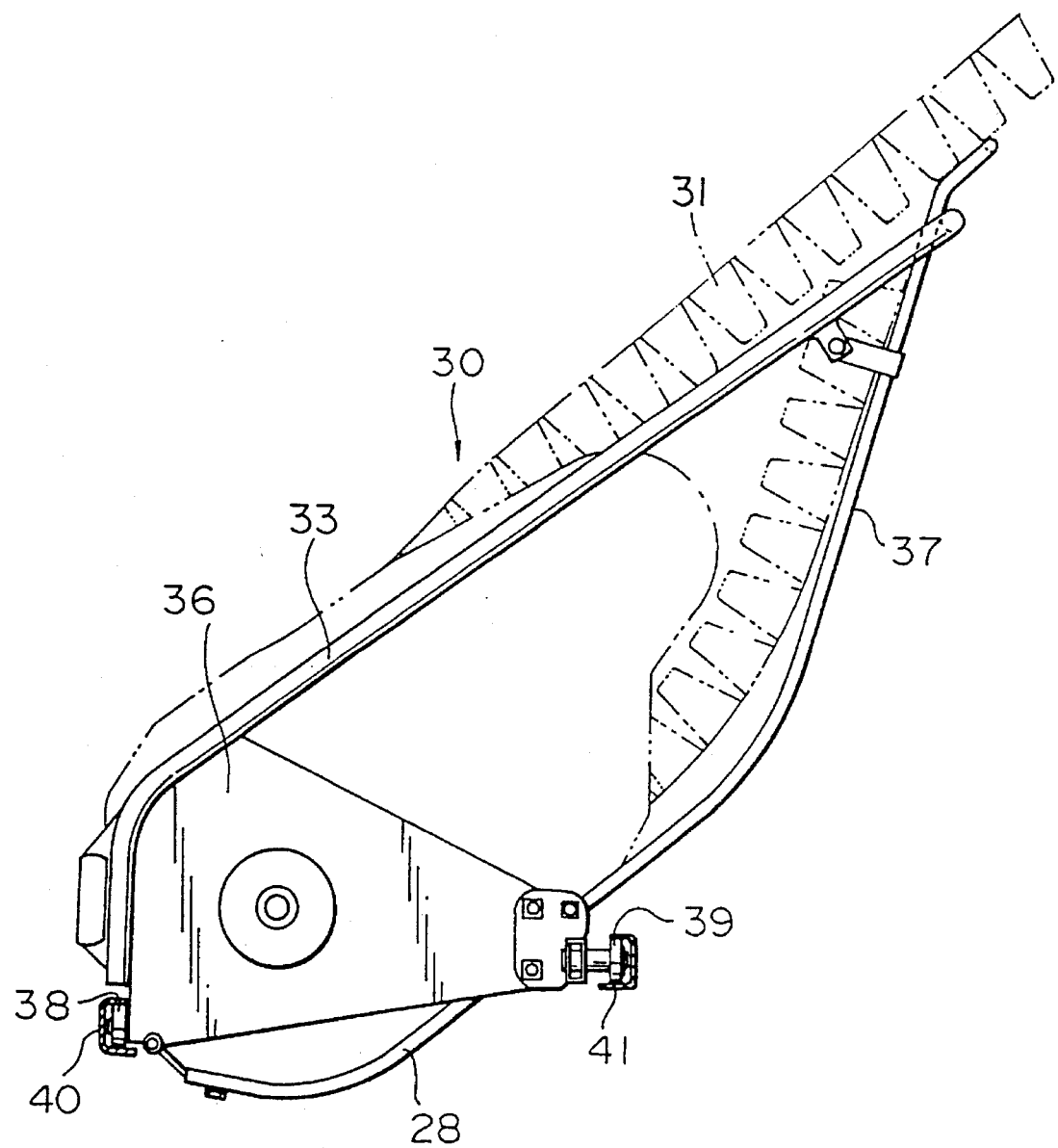
FIG. 7 is a schematic side view showing a traverse sliding portion of the table of the seedling supply device.

The frame 33, as shown in FIGS. 6 and 7, includes a pair of side plates 36 and a tray guide 37 for guiding the tray 31 upwardly after the seedlings have been picked from the tray 31. A longitudinal feeding drive unit 70 of the mechanism 35 described later, is secured on the left side plate 36. As best shown in FIG. 7, guide rollers 38 and 39 are mounted on the front and rear lower portions of the frame 33, respectively. The guide rollers 38 and 39 are slidably supported on rails 40 and 41 respectively, each of which is mounted between the side frames 29a and 29b.

Figure 8:
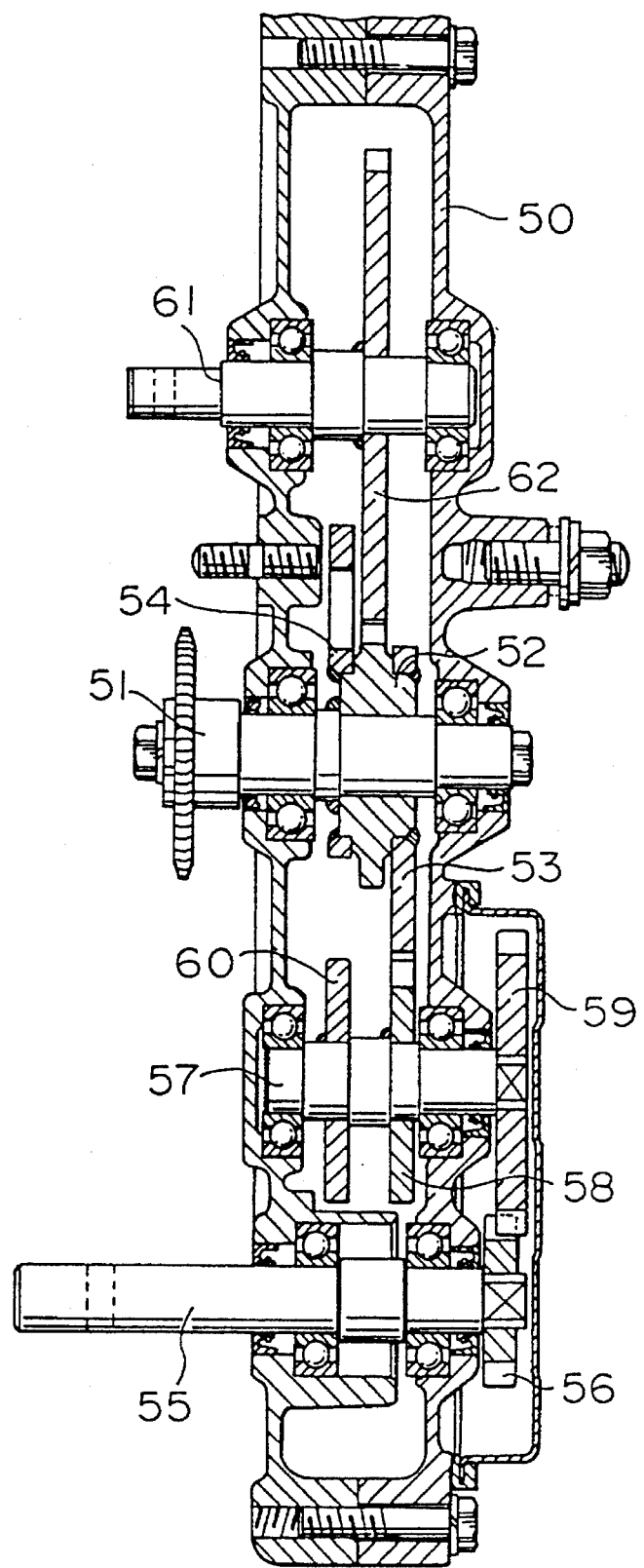
FIG. 8 is a schematic enlarged cross-sectional view of a traverse feeding drive case of the seedling supply system.
Figure 9A:
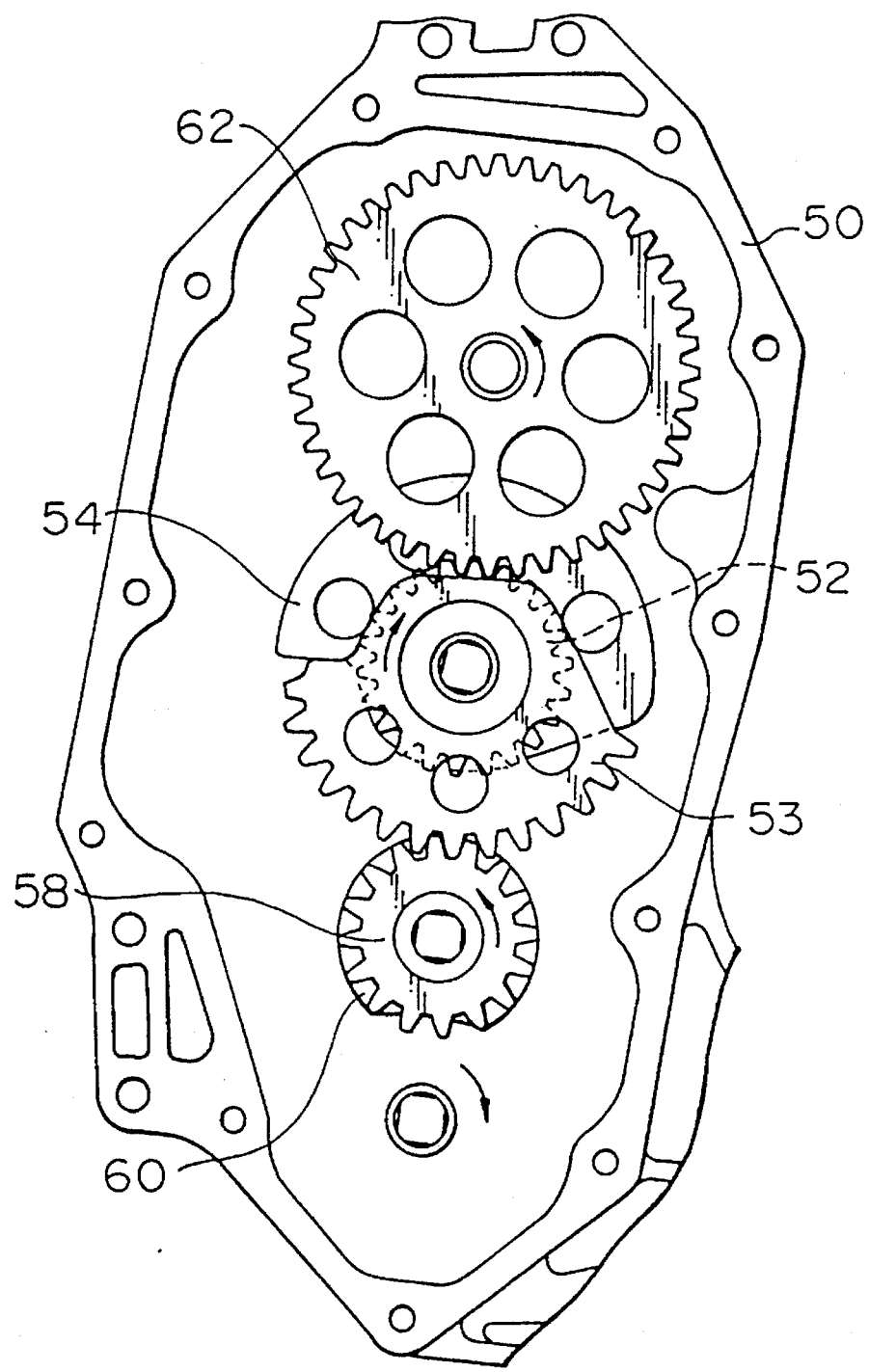
FIGS. 9A and 9B show operating states of a traverse feeding drive case, FIG. 9A showing a seedling tray moving transversely and FIG. 9B showing the seedling tray stopped.
Figure 9B:
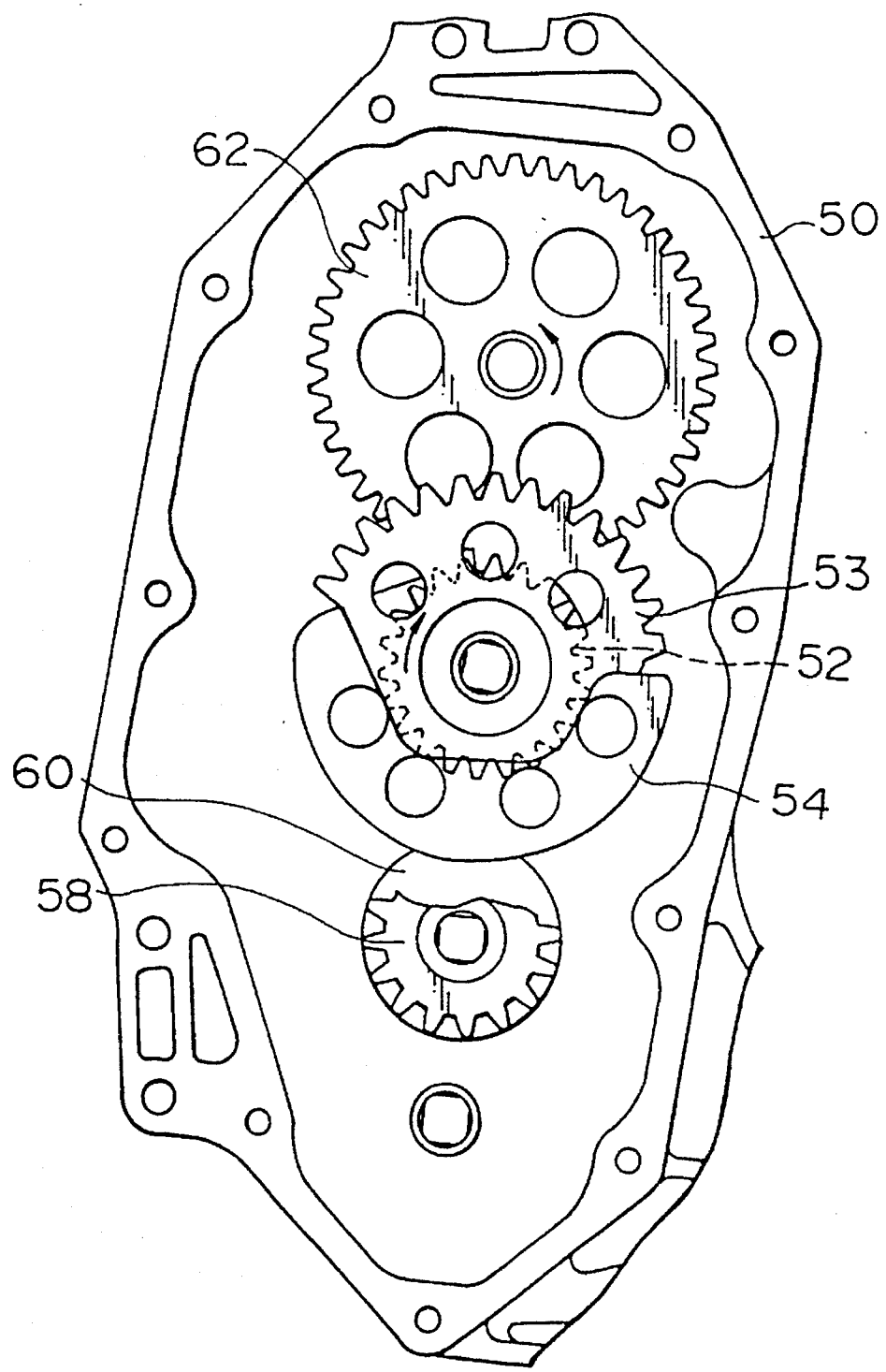
Figure 10:
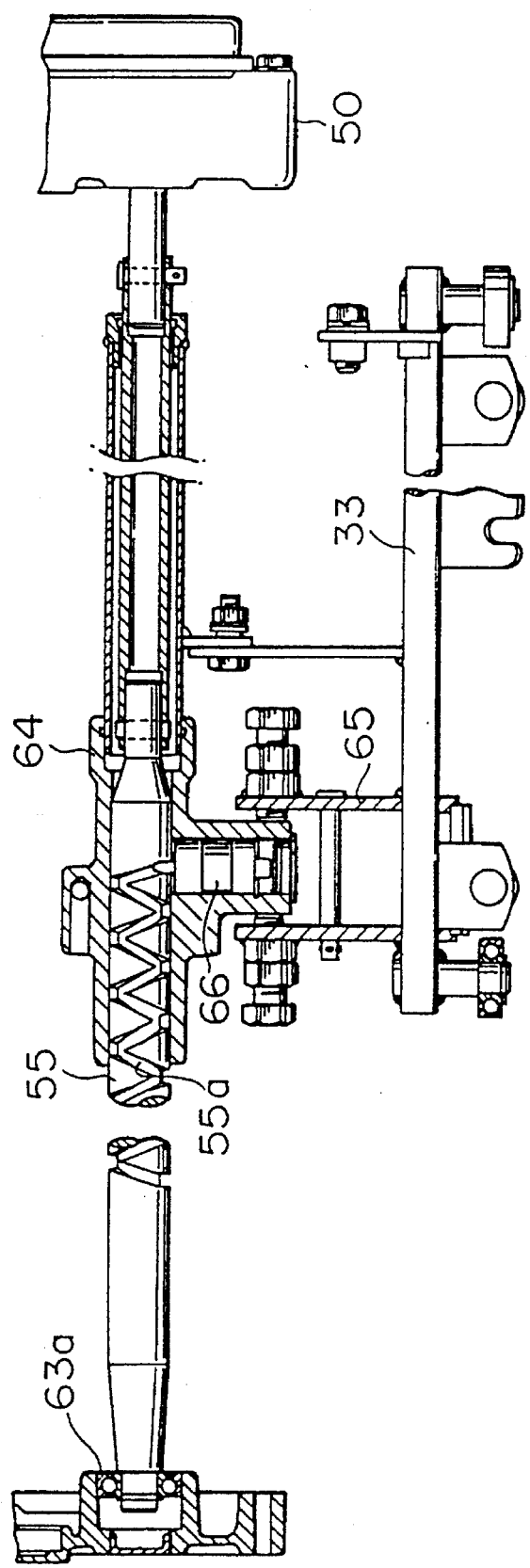
FIG. 10 is a schematic view showing the relation between a supporting frame and a traverse feeding shaft.

As shown in FIGS. 8 to 10, the traverse feeding mechanism 34 of the device 30 includes a traverse feeding drive case 50 which is provided with a traverse feeding drive shaft 51 to which the power from the engine 11 is input through a planting clutch case 200, a counter shaft 203 and a chain 204 which are described later. The traverse feeding drive case 50 is mounted on the left side frame 29b. As shown in FIG. 8, gears 52, 53 and a cam 54 for stopping the traverse feeding of the tray are mounted on the traverse feeding drive shaft 51. One end of a traverse feeding shaft 55 provided with grooves 55a is rotatably supported on one end of the traverse feeding drive case 50 and, a gear 56 is secured to the end of the traverse feeding shaft 55. A counter shaft 57 is rotatably mounted within the drive case 50 between the traverse feeding drive shaft 51 and the traverse feeding shaft 55 and, gears 58, 59 mating with the gears 53 and 56, are secured to the counter shaft 57. A cam 60 for stopping the traverse feeding of the tray 31 is further mounted on the counter shaft 57. As shown in FIG. 9A, when the cam 60 does not engage with the cam 54 secured to the shaft 51, the traverse feeding shaft 55 continues rotating. On the other hand, as shown in FIG. 9B, when the cam 60 engages with the cam 54, the rotation of the traverse feeding shaft 55 is stopped and, therefore, during the insertion of the leading ends of a pair of seedling picker claws 167 into the cell 31a, the traverse feeding of the tray 31 is stopped to effect the insertion of a pair of seedling picker claws 167 described later and the picking of the seedling accurately and easily. Further, a longitudinal feeding drive shaft 61 for driving a longitudinal driving mechanism 35 described later is rotatably supported on the other end of the drive case 50 and, a gear 62 meshing with the gear 52 is fixed to the longitudinal feeding drive shaft 61. As shown in FIG. 5, the other ends of the traverse feeding shaft 55 and the longitudinal feeding drive shaft 61 are supported on bearing portions 63a and 63b mounted on the right side frame 29a.

Further, as shown in FIG. 10, a tubular shaft 64 is fitted into the traverse feeding shaft 55 with an appropriate amount of play and connected to a fittings 65 secured on the frame 33. The tubular shaft 64 is further provided with a pin 66 adapted to engage with the groove 55a on the traverse feeding shaft 55.

According to the above construction, when the traverse feeding drive shaft 51 rotates, the traverse feeding shaft 55 is rotated via the gears 53, 58, 59 and 56. As a result, the pin 66 engaged with the grooves 55a in the traverse feeding shaft 55 is moved transversely, whereby the frame 33 is moved transversely.

The desired traverse feed of the seedling tray 31 can be determined by replacing the gears 59 and 56 with other gears each having different numbers of teeth to modify speed change ratio. More specifically, if the seedling tray 31 is formed with two types of cells, for example measuring 25 mm by 25 mm and 30 mm by 30 mm, traverse feed of the tray 31 corresponding to the size of the cells can be selected.

As shown in FIGS. 11 to 16, the longitudinal feeding mechanism 35 of the seedling supply device 30 includes the longitudinal feeding drive shaft 61 which rotates constantly during the planting operation, and the longitudinal feeding drive unit 70 for transmitting the rotational driving force from the drive shaft 61 to a longitudinal feeding drive structure 98 described later. A pair of longitudinal feeding actuators 71 are mounted on the drive shaft 61 through brackets 67 and 68 and a bolt 69 respectively. Preferably, each of the longitudinal feeding actuators 71 is formed as a cylindrical roller.

Figure 11:
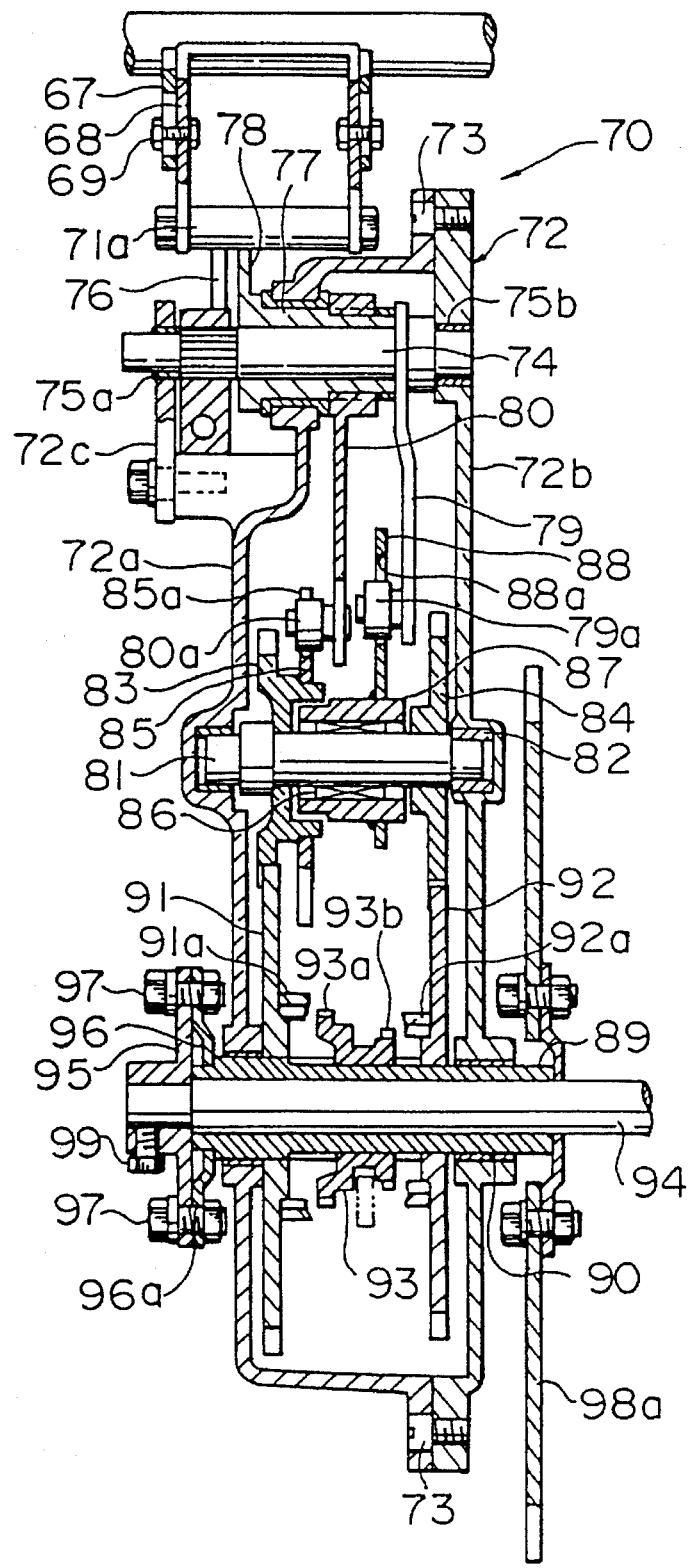
FIG. 11 is a schematic enlarged cross-sectional view of a longitudinal feeding drive unit.

As shown in FIG. 11, the longitudinal feeding drive unit 70 includes a longitudinal feeding drive case 72 removably mounted on the frame 33 through a fitting flange (not shown). The longitudinal feeding drive case 72 is formed by joining two cases 72a and 72b made of aluminium, aluminium alloy or the like together by bolts 73. A follower shaft 74 is rotatably mounted on the side adjacent to the drive shaft 61 of the longitudinal feeding drive case 72 through a bearing 75a formed on a plate 72c projecting from the case 72a and a bearing 75b formed on the case 72b. A longitudinal feeding follower cam 76 is secured on the follower shaft 74 so that one of the longitudinal feeding actuators 71 engages with the follower cam 76 to rotate the shaft 74. Further, the follower shaft 74 is fitted within a hollow shaft 77 so that the hollow shaft 77 can rotate relative to the follower shaft 74. The hollow shaft 77 is provided with a lock releasing follower cam 78 at a location adjacent to the follower cam 76 to rotate the hollow shaft 77 when one of the actuators 71 engages with the cam 78. A longitudinal feeding arm 79 having a roller 79a at its leading end is secured on the follower shaft 74. A locking arm 80 having a roller 80a at its leading end is fixedly secured on the hollow shaft 77.

Further, a follower cam shaft 81 is rotatably mounted on the central portion of the longitudinal feeding drive case 72 through a bearing 82. Gears 83, 84 each having different numbers of teeth are fixedly secured on opposite ends of the follower cam shaft 81. A locking member 85 provided with a plurality of locking grooves 85a is mounted on the boss of the gear 83. The follower cam shaft 81 is further rotatably mounted with a hollow shaft 87 between the gears 83 and 84 through a one-way clutch 86 on which a follower cam 88 having a groove 88a adapted to engage with the roller 79a of the longitudinal feeding arm 79 is secured.

A hollow output shaft 89 is rotatably mounted on the longitudinal feeding drive case 72 at its side opposed to the follower shaft 74 through a bearing 90. The output shaft 89 is mounted with reduction gears 91 and 92 which constantly mesh with the gears 83 and 84 of the follower cam shaft 81. The reduction gears 91 and 92 are integrally formed with internal gears 91a and 92a respectively. The output shaft 89 is mounted at its center portion with a changeover gear 93 so as to slide along the output shaft 89. The changeover gear 93 is provided with external gears 93a and 93b adapted to selectively mesh with the internal gears 91a and 92a by means of a shifter (not shown).

Figure 14:
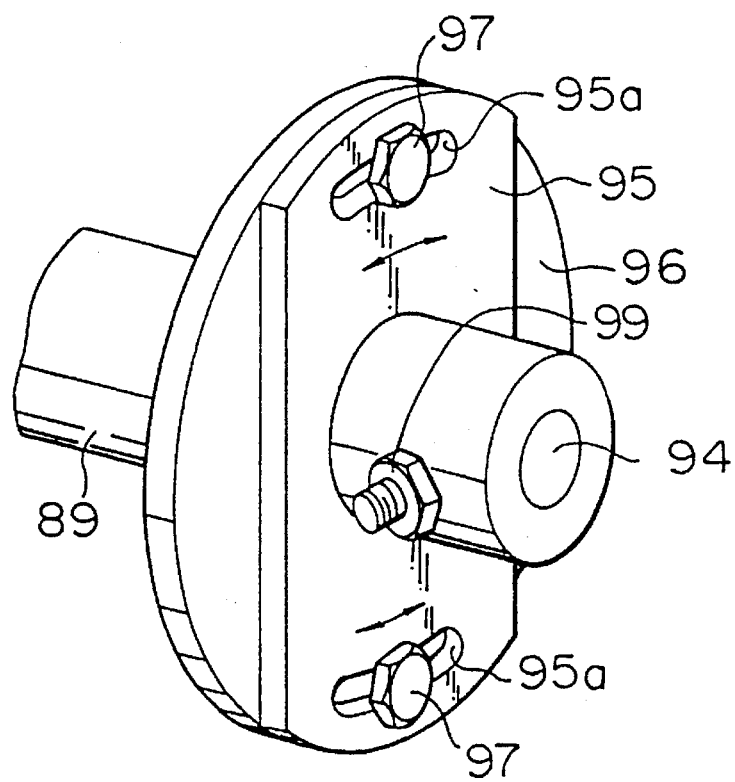
FIG. 14 is a schematic view showing the relation between the output shaft of the longitudinal feeding drive unit and the longitudinal feeding shaft thereof.

A longitudinal feeding shaft 94 having one end rotatably supported on the frame 33 and the other end projecting from the output shaft 89 by a predetermined length is fitted within the output shaft 89 with play. As shown in FIGS. 11 and 14, a flanged connecting member 95 provided with a pair of arcuate slots 95a is secured on the projecting end of the longitudinal feeding shaft 94 and the output shaft 89 is jointed with the longitudinal feeding shaft 94 by a screw bolt 99. As shown in FIG. 14, by utilizing bolts 97 screwed into the holes of the connecting member 95 and the slots 95a, the relative circumferential position of the output shaft 89 to a longitudinal feeding drive structure 98 described later can easily be adjusted.

As shown in FIG. 11, driving sprockets 98a are secured on the longitudinal feeding shaft 94 outside of the longitudinal feeding drive case 72 and, as shown in FIG. 6, the driving sprockets 98a define the longitudinal feeding drive structure 98 together with chains 98b mating with the sprockets 98a and driven sprockets 98c.

Because, as described above, the entire longitudinal feeding drive unit 70 except for the longitudinal feeding follower cam 76 and the lock releasing follower cam 78 is housed within the longitudinal feeding drive case 72, the mounting of the longitudinal feeding mechanism 35 to the frame 33 can easily be effected.

Figure 13:
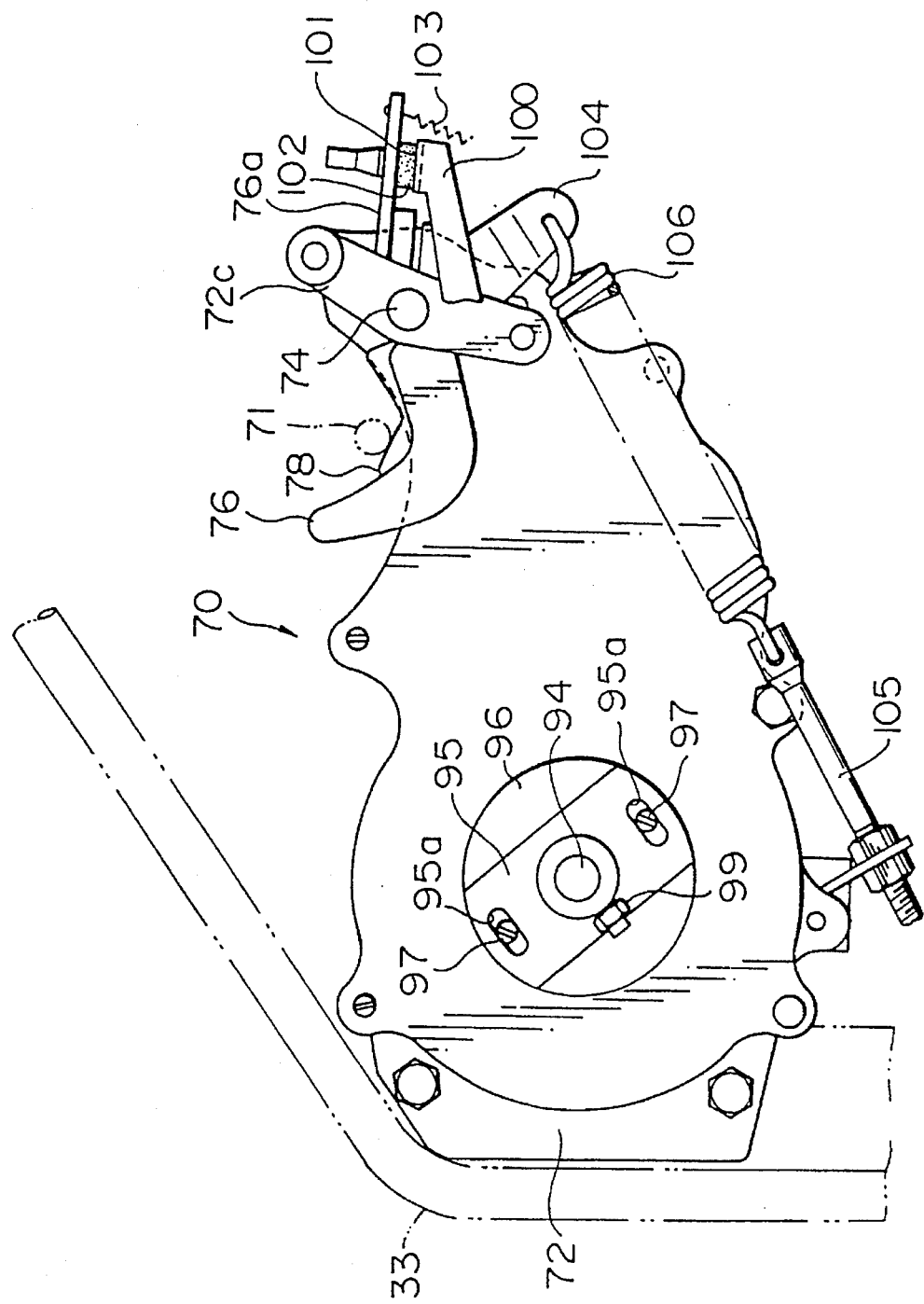
FIG. 13 is a schematic side view showing the longitudinal feeding drive unit.
Figure 15:
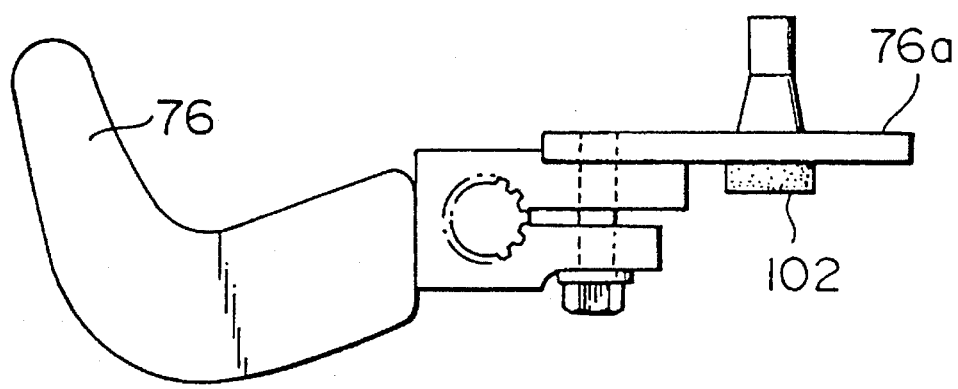
FIG. 15 is a schematic view showing a longitudinal feeding follower cam of a longitudinal feeding mechanism.

As shown in FIG. 13, the bearing plate 72c is provided with a stopper 101 to limit the swing movement of the longitudinal feeding follower cam 76 via an arm 100. As shown in FIGS. 13 and 15, the longitudinal feeding follower cam 76 is mounted with an arm 76a having a stopper rubber body 102 abutting against the stopper 101 and a tension spring 103 for biasing the rubber body 102 against the stopper 101 is provided between a spring support (not shown) and the arm 76a.

Figure 12:
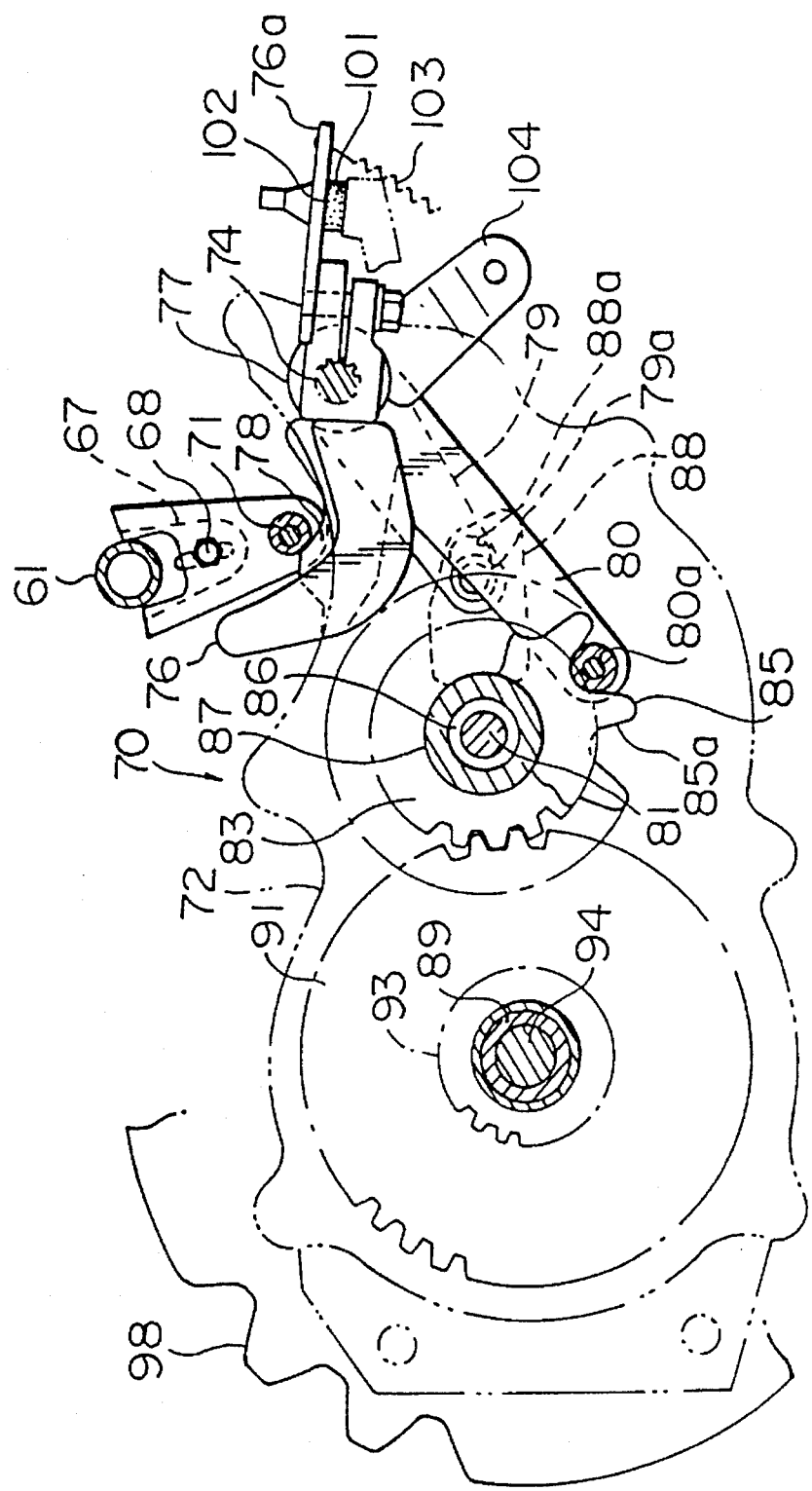
FIG. 12 is a schematic view showing the driving portion of the longitudinal feeding drive unit but omitting the drive case of the unit.
Figure 16:
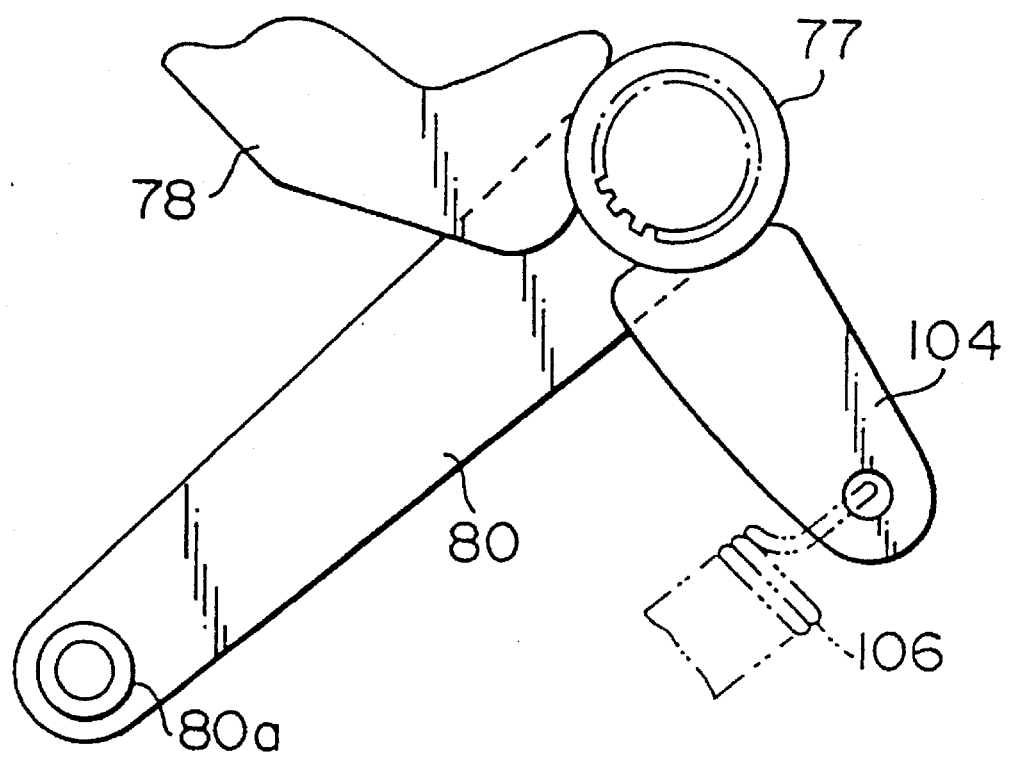
FIG. 16 is a schematic view showing a lock releasing follower cam mounted with a locking arm of the longitudinal feeding mechanism.
Figure 17:
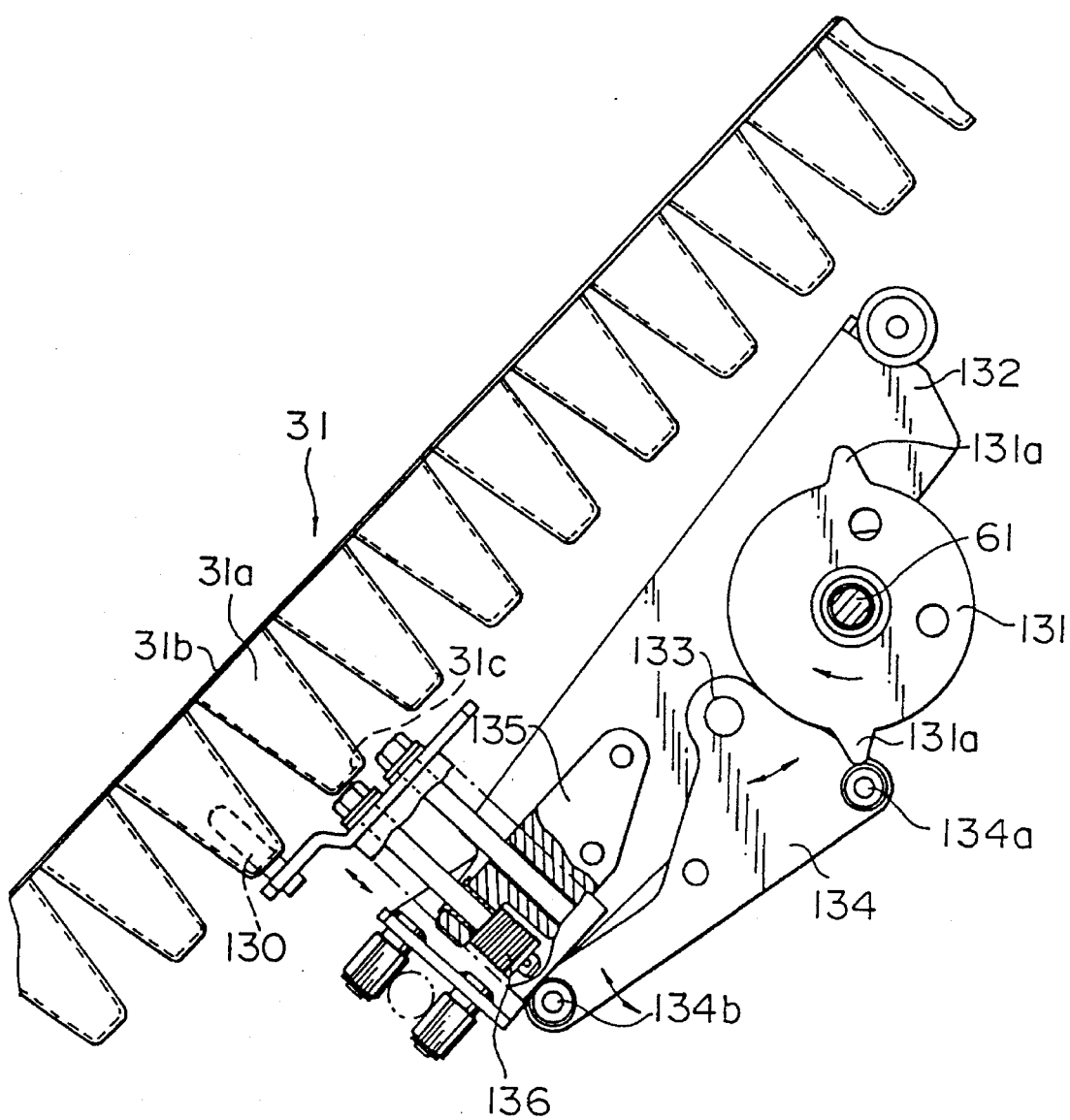
FIG. 17 is a schematic view showing the operational condition of a seedling pushing pin.

As shown in FIGS. 12, 13 and 16, the hollow shaft 77 is mounted with a spring support 104 extending in a direction generally opposite to the follower cam 78 and a spring 106 is provided between a rod 105 mounted on the drive case 72 and the spring support 104 to bias the roller 80a mounted on the leading end of the locking arm 80 against the locking groove 85a of the locking member 85.

The thus constituted longitudinal feeding mechanism 35 operates as follows. When the frame 33 is moved by the transverse feeding mechanism 34 to arrive at its right or left terminal position, the corresponding longitudinal feeding actuator 71 of the drive shaft 61 rotated clockwise in FIG. 12 engages with the cams 76 and 78 to rotate them counterclockwise thereby rotating the shafts 74 and 77, whereby the arms 79 and 80 rotate counterclockwise against the springs 103 and 106. As a result, the counterclockwise rotation of the arm 80 causes the roller 80a to disengage from the groove 85a thereby releasing the follower cam shaft 81 from the locked state. Further, the counterclockwise rotation of the arm 79 causes the cam 88 to be rotated clockwise through the roller 79a engaged with the groove 88a in the cam 88 thereby rotating the shaft 87 counterclockwise. Then, the follower cam shaft 81 is rotated clockwise through the one-way clutch 86. The rotation of the shaft 81 is transmitted to the external gear 93a or 93b, which selectively meshes with the internal gears 91a or 92a by means of a shifter, thereby causing the counterclockwise rotation of the output shaft 89 and longitudinal feeding shaft 94 so that the longitudinal feeding drive structure 98 secured to the longitudinal feeding shaft 94 is rotated. As the rotational movement of the actuator 71 continues until the actuator 71 has passed over the cams 76 and 78, the cams 76 and 78 are returned to the initial positions by the springs 103 and 106 in preparation for further longitudinal feed of the tray 31. By controlling the shifter to change the reduction ratio, longitudinal feed of the tray 31 at a rate corresponding to the reduction ratio can be achieved. More specifically, if the seedling tray 31 is formed with two types of cells, for example measuring 25 mm by 25 mm and 30 mm by 30 mm, longitudinal feed of the tray 31 corresponding to the size of the cells can be selected.

As shown in FIGS. 5 and 17, an ejecting cam 131 having a generally circular shape and provided with projections 131a at diametrically opposed positions is secured on the central portion of the longitudinal feeding drive shaft 61. An ejecting actuator arm 134 is mounted on a plate 132 located at approximately the central portion of the chassis frame 28 so as to be swung about a pivot shaft 133 and has one end provided with a roller 134a adapted to engage with one of the projections 131a of the cam 131. A pin 130 for pushing out seedlings from the bottom of the cell 31a is provided through a mounting member 135 secured to the plate 132 and the pin 130 is pulled from the bottom of the cell 31a by a return spring 136. The actuator arm 134 is also provided at its other end with a roller 134b adapted to engage with the bottom of the mounting member 135.

According to this construction, when the drive shaft 61 rotates clockwise in FIG. 17 to allow the projection 131a of the cam 131 to come into engagement with the roller 134a of the actuator arm 134, the actuator arm 134 is swung about the pivot 133 clockwise in FIG. 17 to allow the roller 134b to engage with the bottom of the pin 130 so that the pin 130 is pushed up through an opening (not shown) formed in the bottom surface of the cell 31a to push out the seedling from the cell 31a. When the projection 131a of the cam 131 moves away from the roller 134a of the actuator arm 134, the pin 130 is returned to the initial position by the spring 136.

As shown in FIGS. 18 to 26, the seedling picker device 150 includes a seedling picker drive mechanism 151 for driving a pair of seedling picker claws 167 described later. The seedling picker drive mechanism 151 includes a rotary case 153 provided with a drive shaft 152 forming an input shaft and is mounted on the plate 154 of the chassis frame 28 so as to rotate about the drive shaft 152. A sun gear 155 secured on the plate 154 is fitted on the drive shaft 152 and meshes with a planetary gear 158 fixed to a crank arm shaft 157 forming an output shaft of the rotary case 153 via an intermediate gear 156. The drive shaft 152 is connected to an output shaft 201 of the seedling planting clutch case 200 described later through a chain 202. According to this construction, when the drive shaft 152 rotates counterclockwise, the crank arm shaft 157 revolves around the drive shaft 152, whereby the sun gear 155 rotates counterclockwise in FIG. 24A and at the same time, the shaft 157 itself rotates clockwise.

Figure 19:
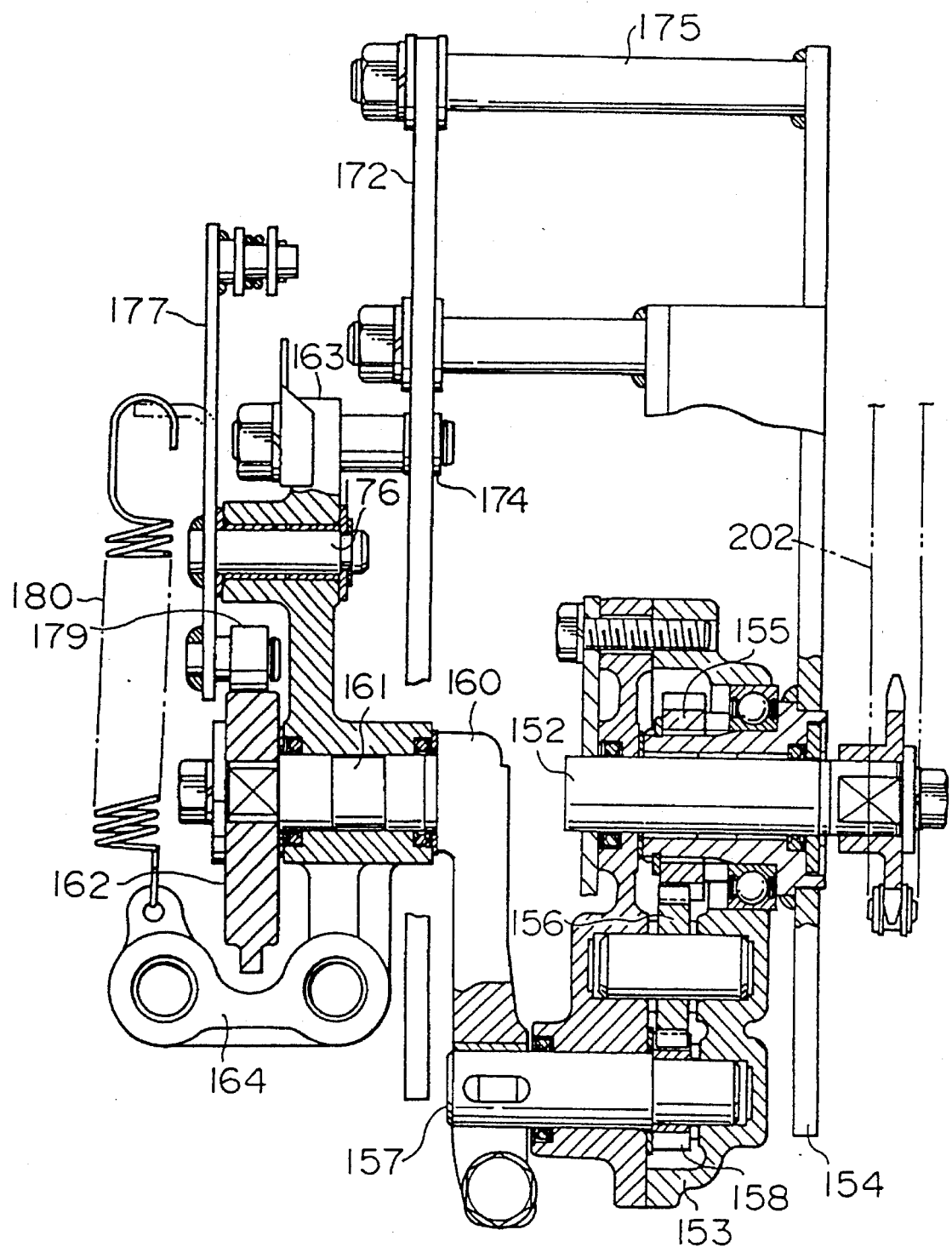
FIG. 19 is a schematic enlarged sectional view of a seedling picker drive mechanism.
Figure 20:
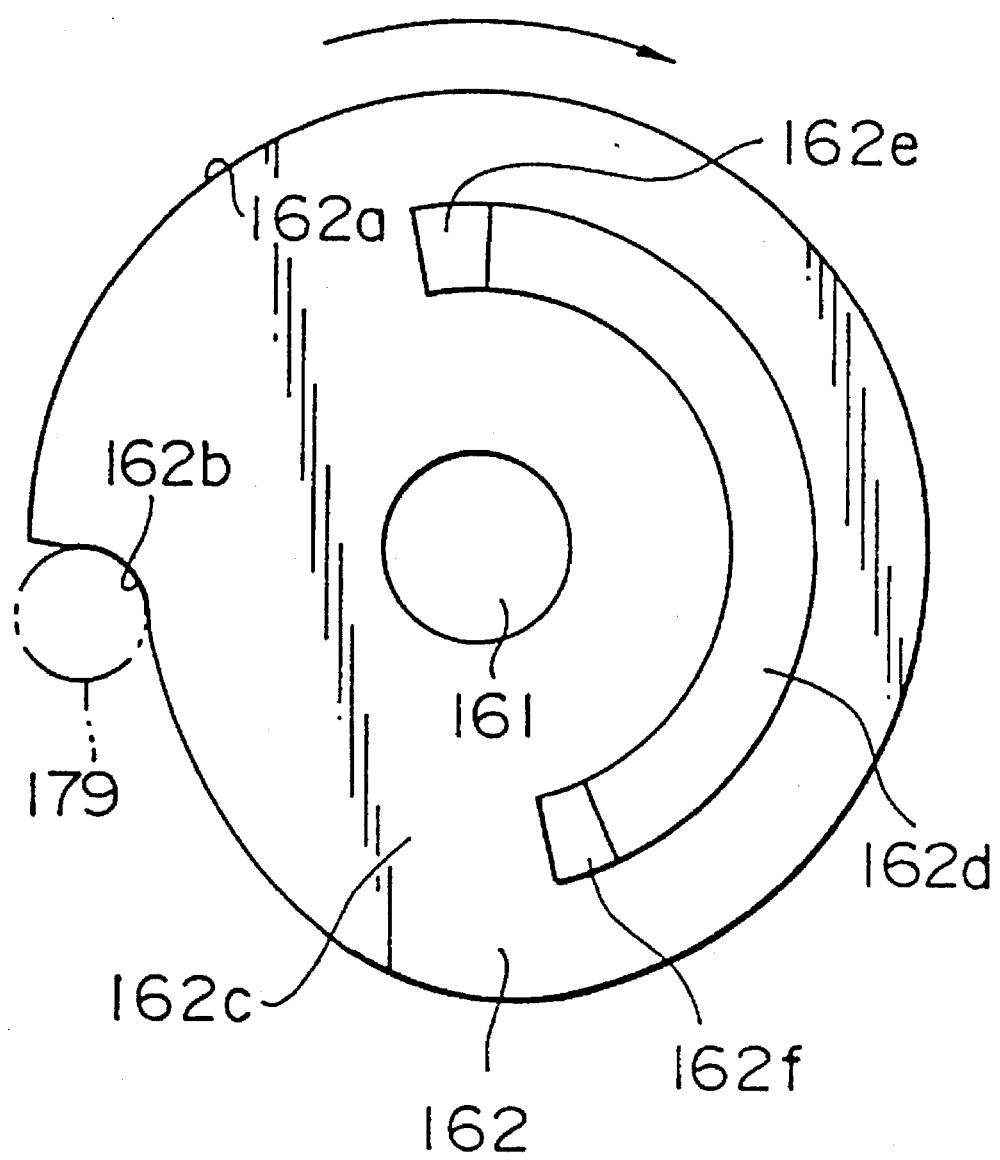
FIG. 20 is a schematic view showing a claw opening and closing cam of the seedling picker drive mechanism.

As shown in FIG. 19, a crank arm 160 is pivoted on the end of the crank arm shaft 157 and a cam shaft 161 is fixed to the leading end of the crank arm 160. A cam 162 for opening and closing the leading ends of the seedling picker claws 167 is mounted on the end of the cam shaft 161. As shown in FIG. 20, the cam 162 is generally disk-shaped and is formed at its outer peripheral surface 162a with a recess portion 162b. The cam 162 is also formed on either side 162c with a semicircular projection 162d provided at its ends with inclined portions 162e and 162f.

Figure 18:
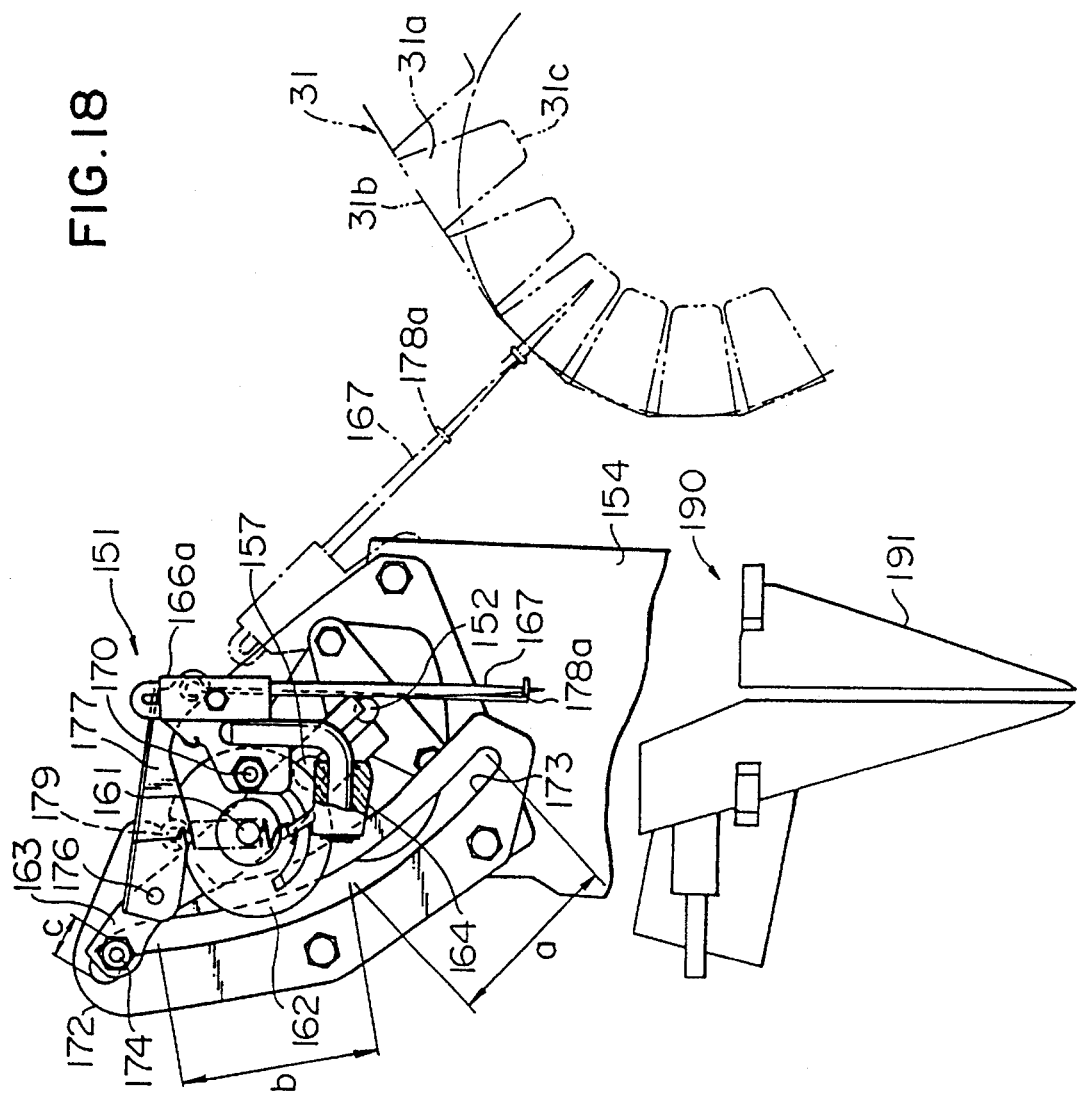
FIG. 18 is a schematic side view of a seedling picker device.
Figure 21:
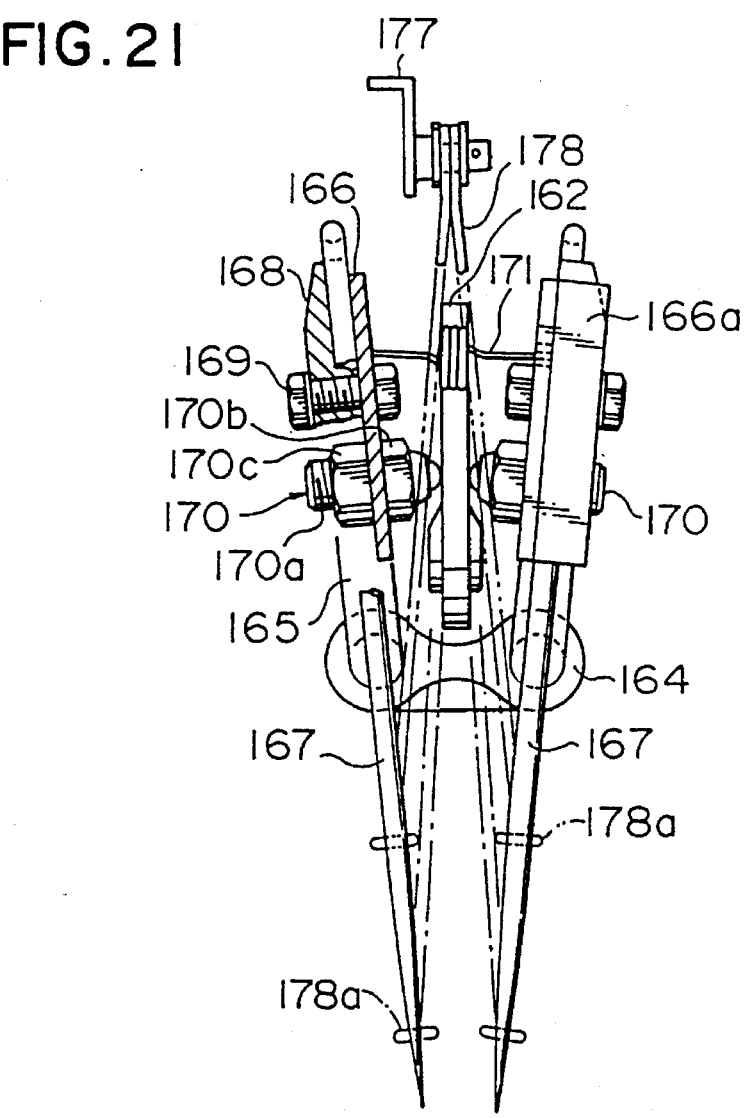
FIG. 21 is a schematic enlarged front view of a pair of seedling picker claws.
Figure 22:
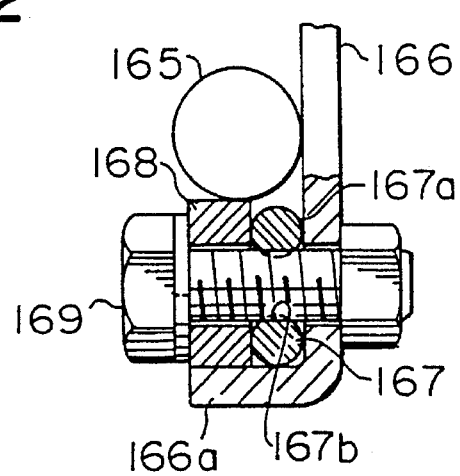
FIG. 22 is a schematic enlarged view showing how the seedling picker claws are mounted.

The cam shaft 161 is pivoted on approximately the center portion of the seeding picker arm 163. As shown in FIGS. 18 and 21, the seedling picker arm 163 is mounted at its end facing the device 30 with a bearing 164 on which a pair of generally L-shaped claw support members 165 are rotatably supported. Mounting plates 166 provided at its end with side portions 166a are secured on the claw support members 165 on which, as shown in FIG. 22, the seedling picker claws 167 can be securely mounted on the plates 166 so as to prevent them from loosening, by clamping each claw 167 between one of the plates 166 and a plate 168 with a screw bolt 169. Further, the side portions 166a prevent the claws 167 from rotating.

Furthermore, the upper end 167a of each seedling picker claws 167 is formed at its inner side with a groove 167b with which the bolt 169 is engaged to effect accurate and quick positioning of the claws 167.

As shown in FIG. 21, the claw support member 165 is mounted with a claw opening and closing member 170 which is defined by a bolt 170a and two nuts 170b and 170c. The members 170 are biased against opposite side surfaces 162c of the cam 162 by springs 171 mounted on the claw support member 165. The bolt 170a and two nuts 170b and 170c are adjusted to control the projecting length of the member 170.

As shown in FIGS. 18 and 19, the seedling picker arm 163 is mounted at its side opposed to the device 30 with a guide member 174 which is slidably guided along an opening 173 in an arm guide plate 172. The arm guide plate 172 is fixedly secured on the mounting plate 154 by bolts 175. As shown in FIG. 18, the opening 173 includes an "a" portion provided at about the lower half of the plate 172 and having a relatively gentle slope, a "b" portion provided at about the upper half of the plate 172 to connect with the "a" portion and having a relatively steep slope, and a "c" portion provided at the uppermost portion of the plate 172 to connect with the "b" portion and having the slope parallel to the "a" portion.

Figure 23A:
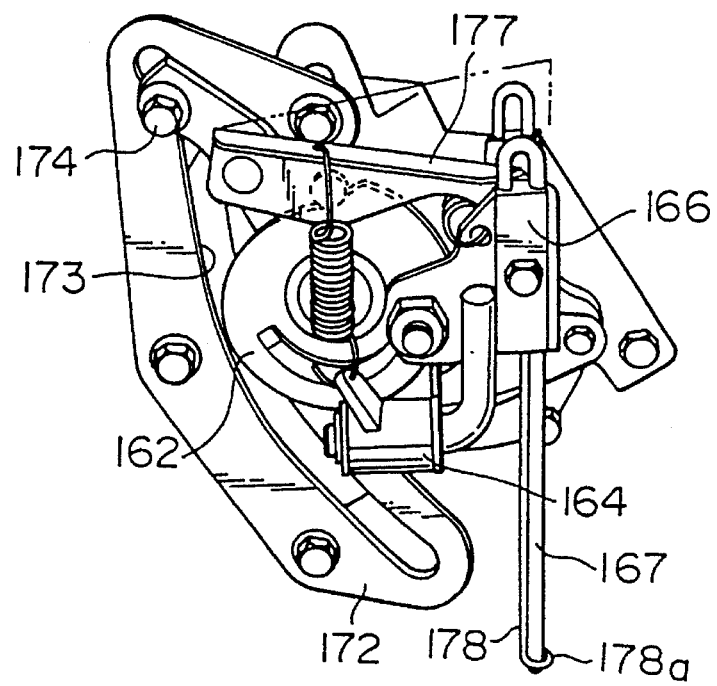
FIGS. 23A and 23B show schematic perspective views of the seedling picker device, FIG. 23A being a schematic view showing the seedling being delivered to the seedling planting device and FIG. 23B being a schematic view showing the seedling being picked from the cell.
Figure 23B:
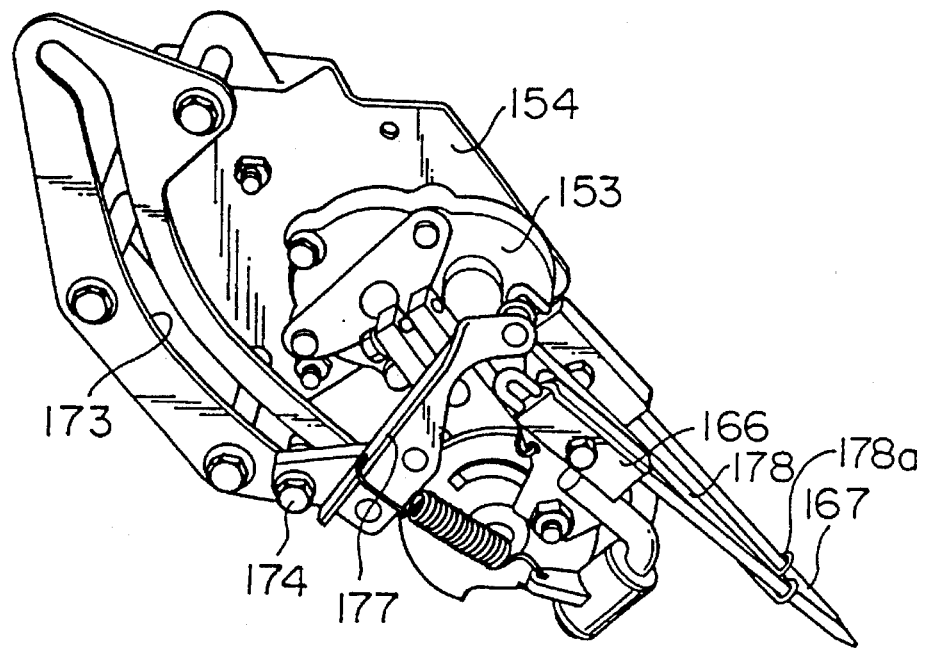

As shown in FIG. 18, the seedling picker arm 163 is rotatably mounted at its portion adjacent to the guide member 174 with a seedling pushing actuator plate 177 through a pivot 176 which, as shown in FIG. 21, has a leading end provided with a pair of seedling push members 178. As shown in FIGS. 21, 23A and 23B, the leading ends of the seedling push members 178 are provided with ring portions 178a through which the corresponding seedling picker claws 167 is passed. The provision of the ring portions 178a in the members 178 enables positive pushing of the seedling, accurate positioning of the members 178 to the claws 167 and, cleaning of the claws 167.

As shown in FIG. 18, a roller 179 abutting against the outer peripheral surface 162a of the cam 162 is provided at approximately the center portion of the actuator plate 177. As described later, when the roller 179 is in the recess 162b of the cam 162, the leading ends of the claws 167 are moved to the seedling delivery position to push down the ring portions 178a of the members 178 toward the leading ends of the claws 167 thereby delivering the seedling to a seedling planting claw 191 described later. As shown in FIG. 19, the actuator plate 177 is connected to the claw support member 165 by a spring 180.

As shown in FIG. 18, the seedling planting device 190 for receiving the seedlings from the seedling picker device 150 and planting them in a field is disposed below the device 150. The device 190 includes a hopper-shaped seedling planting claw 191 for receiving the seedling directly from the device 150. Since the device 190 itself is well-known in the art, it will not be explained in detail.

The thus constituted device 150 operates in the following manner to pick the seedling from the cell 31a and deliver it to the seedling planting device 190.

Figure 24A:
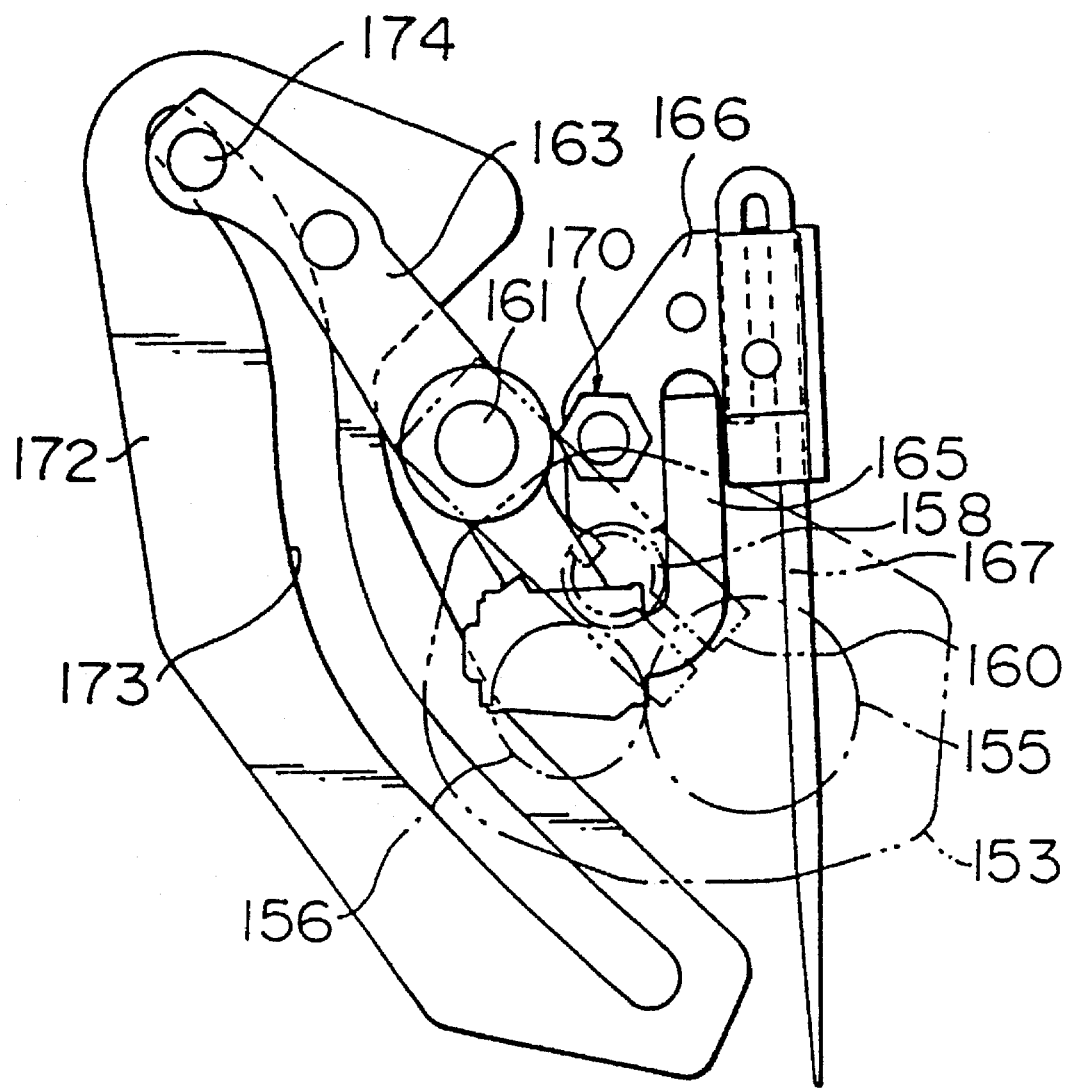
FIGS. 24A to 24E are schematic views of the seedling picker device in operation.

FIG. 24A shows the initial condition of the seedling picker claws 167 wherein the guide member 174 of the arm 163 lies at the top dead center of the opening 173 in the plate 172 and the leading ends 167b of the claws 167 are directed almost straight downward. In this condition, the claw opening and closing member 170 abuts against the both side surfaces 162c of the cam 162 so that the leading ends of the claws 167 are open. Further, the roller 179 in the actuator plate 177 is located in the recess portion 162b of the cam 162 and the ring portions 178a of the seedling push members 178 is biased to the leading ends of the claws 167 by the spring 180.

Figure 24B:
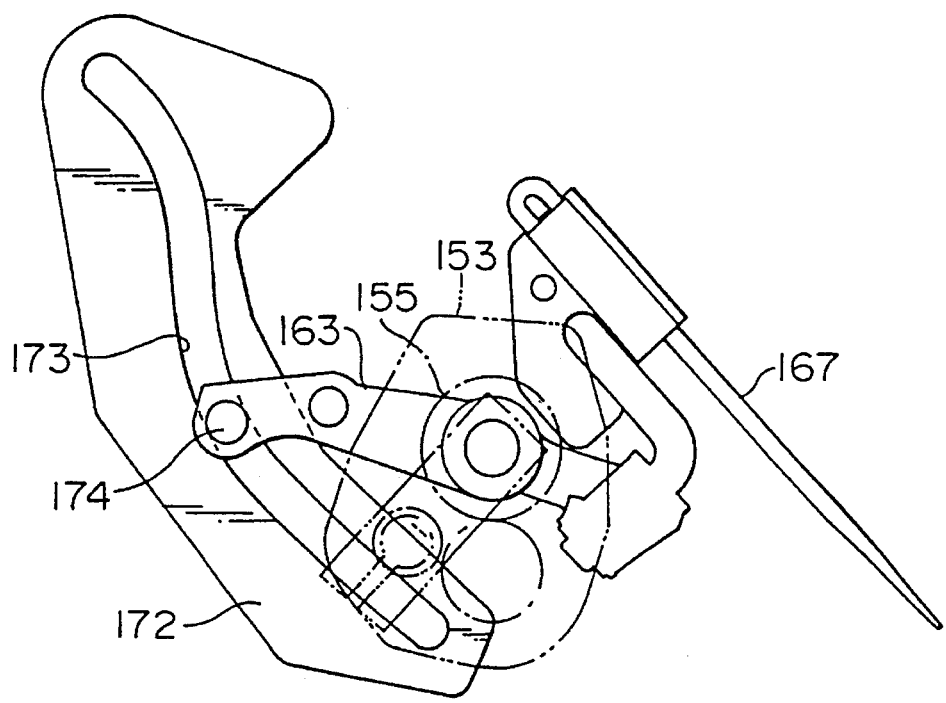

As shown in FIG. 24B, when the rotary case 153 has rotated by 90 degrees counterclockwise, the guide member 174 of the arm 163 is moved to the central portion of the opening 173 in the plate 172 and the arm 163 moves to the right in FIG. 24B so that the leading ends of the claws 167 approach the cell 31a of the tray 31. In this condition, the location of the cam shaft 161 is identical with that of the sun gear 155 as viewed in FIG. 24B. The claw opening and closing member 170 still abuts against both side surfaces 162c of the cam 162 and therefore, the leading ends of the claws 167 are opened. The roller 179 of the actuator plate 177 escapes from the recess portion 162b of the cam 162 to abut against the outer peripheral surface 162a so that the ring portions 178a of the members 178 are moved upwardly from the leading end of the claw by the spring 180.

Figure 24C:
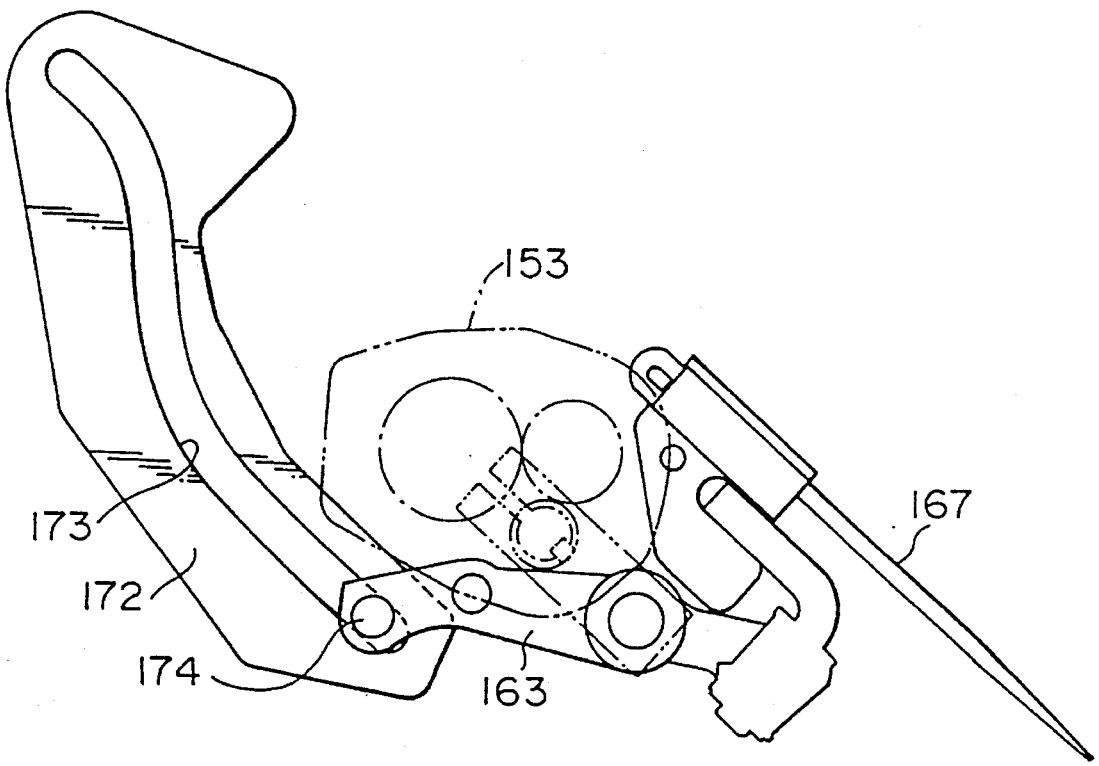

As shown in FIG. 24C, when the rotary case 153 has rotated by 180 degrees counterclockwise, the guide member 174 of the arm 163 lies at the bottom dead center of the opening 173 in the plate 172 and, therefore, the arm 163 further moves to the right so that the claws 167 reach the cell 31a of the tray 131 and the leading ends of the claws 167 are inserted into the cell 31a. Just before the guide member 174 reaches the bottom dead center of the opening 173, the claw opening and closing member 170 rides on the inclined portion 162e to allow the leading ends to close so that the seedling in the cell 31a is gripped. The roller 179 in the actuator plate 177 abuts against the outer peripheral surface 162a of the cam 162 and, therefore, the ring portions 178a of the members 178 are located above the claws 167. In this condition, the roller 134b in the actuator arm 134 engages with the bottom of the pin 130 to push up the pin 130 so that the pin 130 pushes out the seedling from the cell 31a. Preferably, the mounting of the claws 167 on the member 165 is adjusted so that the depth by which the claws 167 are inserted into the seedling is about 70–90% of the depth of the seedling.

Figure 24D:
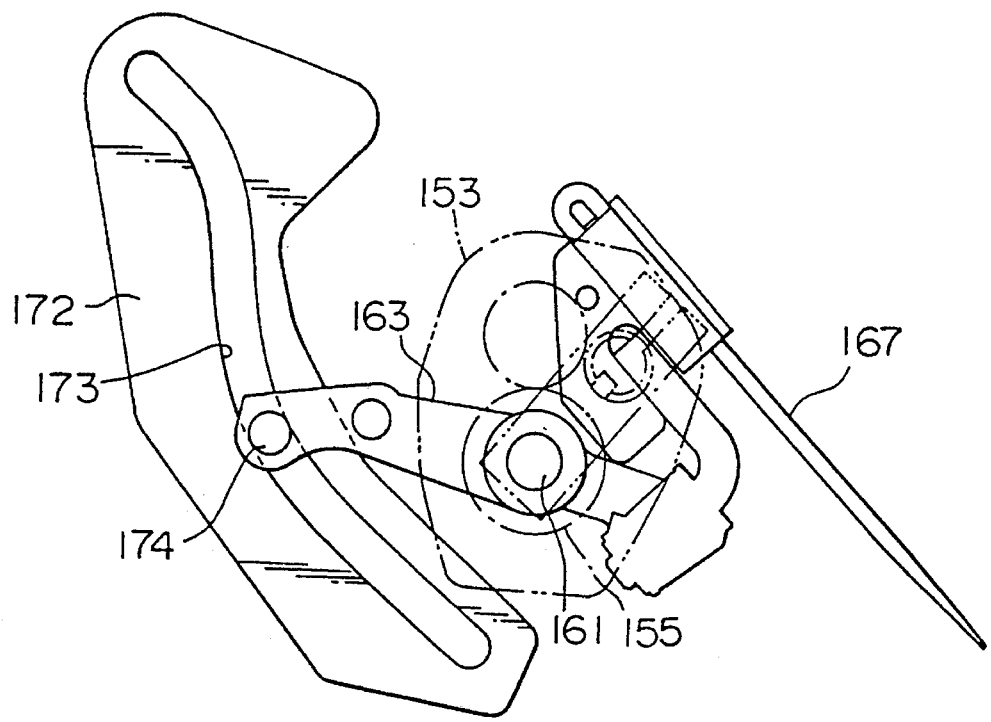

As shown in FIG. 24D, when the rotary case 153 has rotated by 270 degrees counterclockwise, the guide member 174 of the arm 163 moves from the bottom dead center of the opening 173 in the plate 172 to almost the center portion thereof and, therefore, the arm 163 moves to the left in FIG. 24D so that the claws 167 move away from the cell 31a while gripping the seedling. In this condition, the location of the cam shaft 161 is identical with that of the sun gear 155, the same as in FIG. 24B. The claw opening and closing member 170 abuts against the projection 162d in the cam 162, whereby the leading ends of the claws 167 are opened so that the seedling remains gripped by the claws 167. Since the roller 179 in the actuator plate 177 abuts against the outer peripheral surface 162a, the ring portions 178a of the members 178 continue to be held above the claws 167 by the spring 180.

Figure 24E:
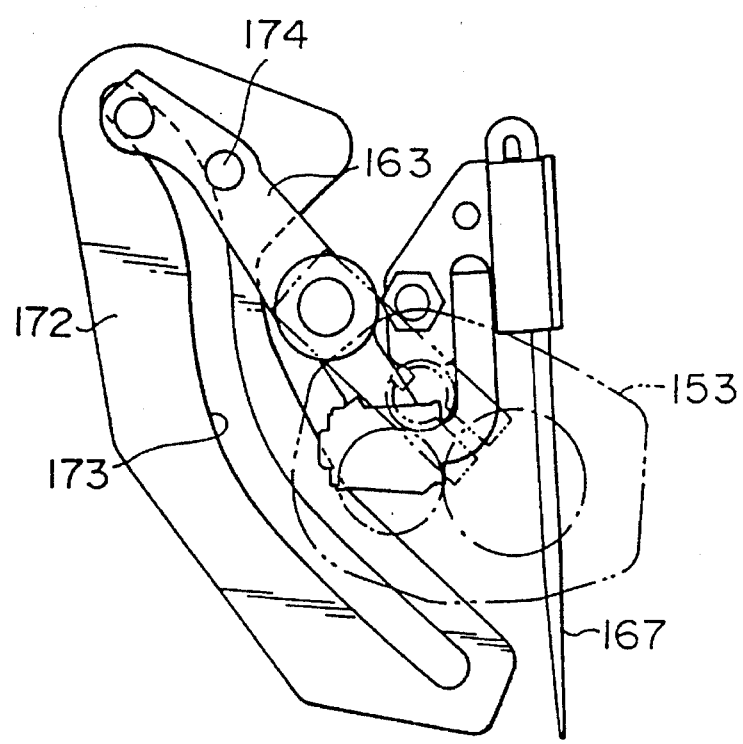

Further, as shown in FIG. 24E, when the rotary case 153 has rotated by 360 degrees counterclockwise, the guide member 174 of the arm 163 moves to the top dead center of the opening 173 in the plate 172 and, as a result, the arm 163 further moves to the left so that the leading ends of the claws 167 are directed almost straight downward, which means that the claws 167 lie almost directly above the seedling planting claw 191. As the guide member 174 is moved to the top dead center of the opening 173, the claw opening and closing member 170 is moved from the projection 162d in the cam 162 through the inclined portion 162f to both side surfaces 162c so that the leading ends of the claws 167 are opened. In this condition, the roller 179 in the actuator plate 177 moves from the outer peripheral portion 162a to the recess portion 162b and, therefore, the ring portions 178a of the members 178 are moved from the upper portion of the members 178 to the leading end thereof by the effect of the spring 180 so that the seedling is pushed down to fall in the seedling planting claw 191.

Figure 25:
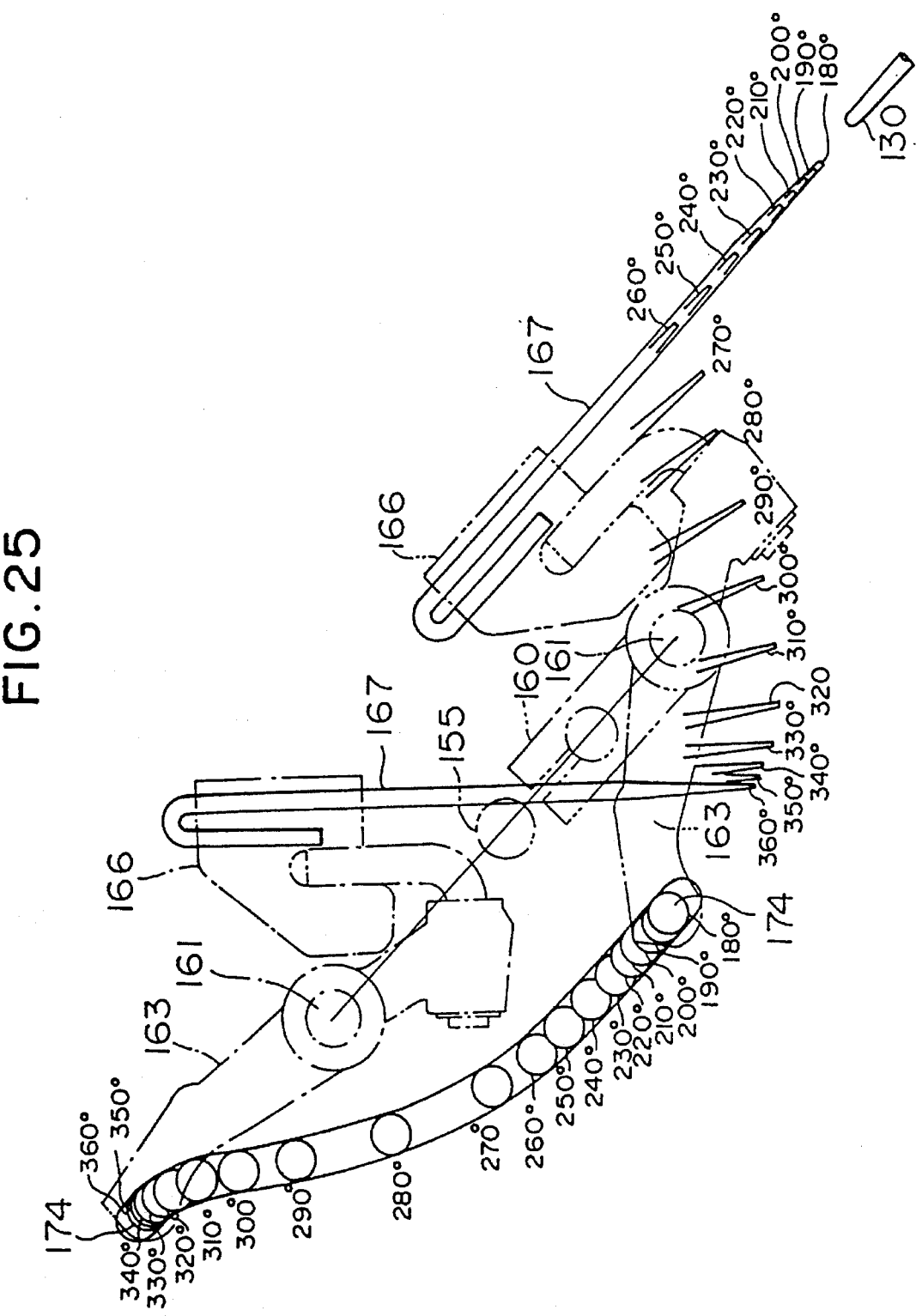
FIG. 25 is a schematic view showing the loci of the members of the seedling picker device during operation.

Considering the above-described operation in connection with the locus of the cam shaft 161, as shown in FIG. 25, the cam shaft 161 moves along the straight line at the middle point of which the sun gear 155 is located.

By repeating the above-described operation, the seedlings can be picked from the cells 31a of the tray 31 in sequence and delivered to the seedling planting claw 191.

In the opening 173 in the arm guide plate 172, since the transitional portion from the "a" portion to the "b" portion curved gently, the seedling picking operation can be effected smoothly without having an impact on the seedling. Further, as best shown in FIG. 25, the movement of the leading ends of the seedling picker claws 167 becomes slow at the position of picking the seedling (180°) and the position of delivering it (360°) and, therefore, the operation of picking and delivering the seedling can be effected smoothly.

The above-described seedling supply device 30 and seedling picker device 150 are operated by utilizing the power of the engine 11. More specifically, as shown in FIG. 4, a seedling planting clutch case 200 to which the power from the engine 11 is transmitted is disposed between the engine 11 and the seedling picker device 150. The seedling planting clutch case 200 is provided with a seedling planting clutch (not shown) which can be controlled by the lever 25 for bringing it into and out of driving engagement with the devices 30 and 150. The output shaft 201 of the seedling planting clutch case 200 is connected to the drive shaft 152 of the rotary case 153 through the chain 202. Further, a counter shaft 203 rotated through the chain 202 is connected to the traverse feeding drive shaft 51 through a chain 204.

How a seedling is picked from a cell 31a by the apparatus 10 constructed in accordance with the above will now be explained with reference to FIGS. 26(a) to 26(e). First of all, the initial setting of the seedling picker claws 167 is effected so that the space W1 between the leading ends of the claws 167 is slightly wider than the width W2 of the bottom of the cell 31a (FIG. 26(a)). Then, the leading ends of the claws 167 are inserted into the seedling (FIG. 26(b)) and brought closer together to grip the seedling so that the space W1 between the leading ends of the claws 167 is slightly narrower than the width W2 of the bottom 31c of the cell 31a (FIG. 26(c)). The seedling is then picked from the cell 31a by gripping it with the claws 167 (FIG. 26(d)) and the picked seedling is moved to the delivering position to be delivered to it (FIG. 26(e)). Further, the claws 167 are reset to the initial position shown in FIG. 26(a) and moved to the next seedling picking position. By repeating such an operation, the seedlings can be gripped by the claws 167 so that they do not fall apart. At the same time, since the pulling-out of the claws 167 can be effected smoothly and accurately, during the delivery of the seedling to the claw 191, the working efficiency of a planting can be improved.

According to the present invention, since the seedling is supplied to the seedling picker device accurately by the seedling supply device provided with longitudinal and traverse feeding mechanisms and, at the same time, the seedling can be gripped by the claws so that it does not fall apart, the efficiency of the seedling planting can be improved remarkably.

The present invention has thus been shown and described with reference to specific embodiments. However, it should be noted that the present invention is in no way limited to the details of the described arrangements but changes and modifications may be made without departing from the scope of the appended claims.

We claim:

1. A seedling planting apparatus including a carriage, a seedling supply device(30), a seedling picker device(150) for picking seedlings from the seedling supply device(30) at a predetermined picking position, and a seedling planting device(190) for receiving the seedlings from the seedling picker device(150) at a predetermined delivery position and planting them in a field, the seedling supply device(30) including a frame(33) for supporting a seedling tray(31) formed with multiple cells(31a) in which seedlings are grown, a traverse feeding mechanism(34) for moving the frame(33) transversely so that a selected cell is located at the predetermined picking position, and a longitudinal feeding mechanism(35) for longitudinally feeding the seedling tray(31) pitch by pitch when the frame(33) is moved to a right or left terminal position thereof, the seedling picker device(150) including a pair of seedling picker claws(167) for picking the seedling from the cell(31a) and delivering it to the seedling planting device(190), and a seedling picker driving mechanism(151) for moving the seedling picker claws(167) from the predetermined picking position to the predetermined delivery position with the seedling picker claws(167) assuming an inclined posture in the picking position and a substantially erect posture in the delivery position, after the seedling picker claws(167) have been inserted into the cells(31a), the space between leading ends of the seedling picker claws(167) is narrowed by a cam(162) operatively connected with the seedling picker driving mechanism(151) to grip the seedlings.

2. A seedling planting apparatus in accordance with claim 1, wherein the longitudinal feeding mechanism(35) includes a longitudinal feeding drive shaft(61) provided at both of its ends with a pair of longitudinal feeding actuators(71) and rotating constantly during planting operation, a follower cam shaft(74) rotating in response to an intermittent movement of the longitudinal feeding actuators(71) involved in a longitudinal feeding shaft(94) to which a rotation of the follower cam shaft(74) is transmitted, driving sprockets(98a) mounted on the longitudinal feeding shaft(94), and chains(98b) hung around the driving sprockets(98a); the cam follower shaft(74) and the longitudinal feeding shaft(94) being within a single housing.

3. A seedling planting apparatus in accordance with claim 1, wherein the seedling picker device(150) comprises a planetary gear mechanism.

4. A seedling planting apparatus in accordance with claim 2, wherein the seedling picker device(150) comprises a planetary gear mechanism.

5. A seedling planting apparatus in accordance with claim 1, wherein the seedling picker claws(167) are mounted with pushing members(178) for pushing out the seedling gripped thereby at the predetermined delivery position.

6. A seedling planting apparatus in accordance with claim 2, wherein the seedling picker claws(167) are mounted with pushing members(178) for pushing out the seedling gripped thereby at the predetermined delivery position.

7. A seedling planting apparatus in accordance with claim 3, wherein the seedling picker claws(167) are mounted with pushing members(178) for pushing out the seedling gripped thereby at the predetermined delivery position.

8. A seedling planting apparatus in accordance with claim 5, wherein the pushing members(178) comprises ring members(178a) inserted over the picker claws(167).

9. A seedling planting apparatus in accordance with claim 6, wherein the pushing members(178) comprises ring members(178a) inserted over the picker claws(167).

10. A seedling planting apparatus in accordance with claim 7, wherein the pushing members(178) comprises ring members(178a) inserted over the picker claws(167).

11. A seedling supply device for a seedling planting apparatus, wherein the seedling supply device includes a frame(33) for supporting a seedling tray(31) formed with multiple cells(31a) in which seedlings are grown, a traverse feeding mechanism(34) for moving the frame(33) transversely so that a selected cell is located at a predetermined picking position, and a longitudinally feeding mechanism(35) for longitudinally feeding the seedling tray(31) pitch by pitch when the frame(33) is moved to a right or left terminal position thereof;

and wherein the longitudinal feeding mechanism(35) includes a longitudinal feeding drive shaft(61) provided at both of its ends with a pair of longitudinal feeding actuators(71) and rotating constantly during planting operation, a follower cam shaft(74) rotating in response to an intermittent movement of the longitudinal feeding actuators(71) involved in a rotation of the longitudinal feeding drive shaft(61), a longitudinal feeding shaft(94) to which a rotation of the follower cam shaft(74) is transmitted, driving rotation of the follower cam shaft(74) is transmitted, driving sprockets(98a) mounted on the longitudinal feeding shaft(94), and chains(98b) hung around the driving sprockets(98a); the cam follower shaft(74) and the longitudinal feeding shaft(94) being within a single housing.

12. A seedling picker device mounted on a seedling planting apparatus including a seedling supply device(30) and a seedling planting device(190) and adapted for picking a seedling from the seedling supply device(30) at a predetermined picking position and delivering it to the seedling planting device(190) at a predetermined delivery position, wherein the seedling picker device(150) includes a pair of seedling picker claws(167) for picking the seedling from a cell(31a) provided in the seedling supply device(30) and delivering it to the seedling planting device(190), and a seedling picker driving mechanism(151) for moving the seedling picker claws(167) from the predetermined picking position to the predetermined delivery position with the seedling picker claws(167) assuming an inclined posture in the picking position and a substantially erect posture in the delivery position, after the seedling picker claws(167) have been inserted into the cells(31a), the space between leading ends of the seedling picker claws(167) is narrowed by a came(162) operatively connected with the seedling picker driving mechanism(151) to grip the seedlings.

13. A seedling picker device for a seedling planting apparatus in accordance with claim 12, which comprises a planetary gear mechanism.

14. A seedling picker device for a seedling planting apparatus in accordance with claim 12, wherein the seedling picker claws(167) are mounted with pushing members(178) for pushing out the seedling gripped thereby at the predetermined delivery position.

15. A seedling picker device for a seedling planting apparatus in accordance with claim 13, wherein the seedling picker claws(167) are mounted with pushing members(178) for pushing out the seedling gripped thereby at the predetermined delivery position.

16. A seedling picker device for a seedling planting apparatus in accordance with claim 14, wherein the pushing members(178) comprises ring members(178a) inserted over the seedling picker claws(167).

17. A seedling picker device for a seedling planting apparatus in accordance with claim 15, wherein the pushing members(178) comprises ring members(178a) inserted over the seedling picker claws(167).

* * * * *